US011832364B2

(12) United States Patent
Bismuto et al.

(10) Patent No.: US 11,832,364 B2
(45) Date of Patent: Nov. 28, 2023

(54) SYSTEMS AND METHODS FOR WAVELENGTH LOCKING IN OPTICAL SENSING SYSTEMS

(71) Applicant: Apple Inc., Cupertino, CA (US)

(72) Inventors: Alfredo Bismuto, Sunnyvale, CA (US); Yi-Kuei Ryan Wu, Cupertino, CA (US); Thomas Schrans, Pasadena, CA (US); Andrea Trita, Pasadena, CA (US); Aaron Zilkie, Pasadena, CA (US)

( * ) Notice: Subject to any disclaimer, the term of this patent is extended or adjusted under 35 U.S.C. 154(b) by 0 days.

(21) Appl. No.: 17/373,167

(22) Filed: Jul. 12, 2021

(65) Prior Publication Data
US 2021/0345468 A1 Nov. 4, 2021

Related U.S. Application Data

(63) Continuation of application No. 16/582,949, filed on Sep. 25, 2019, now Pat. No. 11,064,592.
(Continued)

(51) Int. Cl.
*H05B 47/105* (2020.01)
*G02B 6/42* (2006.01)
(Continued)

(52) U.S. Cl.
CPC .......... *H05B 47/105* (2020.01); *G01J 1/0238* (2013.01); *G01J 1/4228* (2013.01);
(Continued)

(58) Field of Classification Search
CPC .. G02B 6/29; G02B 6/29301; G02B 6/29328; G02B 6/29343; G02B 6/2838; G02B 6/29395; G01J 1/0238; G01J 1/4228
See application file for complete search history.

(56) References Cited

U.S. PATENT DOCUMENTS 6,487,336 B1 * 11/2002 Yao ........................ G02B 6/266
398/79
7,333,690 B1   2/2008 Peale et al.
(Continued)

FOREIGN PATENT DOCUMENTS

CN     113218518    8/2021
JP     H04353804    2/1992
(Continued)

OTHER PUBLICATIONS

U.S. Appl. No. 17/827,281, filed May 27, 2022, Mahmoud et al.
(Continued)

*Primary Examiner* — Tina M Wong
(74) *Attorney, Agent, or Firm* — Brownstein Hyatt Farber Schreck, LLP

(57) ABSTRACT

Disclosed herein is an integrated photonics device including a frequency stabilization subsystem for monitoring and/or adjusting the wavelength of light emitted by one or more light sources. The device can include one or more selectors that can combine, select, and/or filter light along one or more light paths, which can include light emitted by a plurality of light sources. Example selectors may include, but are not limited to, an arrayed waveguide grating (AWG), a ring resonator, a plurality of distributed Bragg reflectors (DBRs), a plurality of filters, and the like. Output light paths from the selector(s) can be input into one or more detector(s). The detector(s) can receive the light along the light paths and can generate one or more signals as output signal(s) from the frequency stabilization subsystem. A controller can monitor the wavelength and can adjust or generate control signal(s) for the one or more light sources to lock the monitored wavelength to a target wavelength (or within a targeted range of wavelengths).

20 Claims, 14 Drawing Sheets

Related U.S. Application Data

(60) Provisional application No. 62/738,649, filed on Sep. 28, 2018.

(51) Int. Cl.
  *G02B 6/293* (2006.01)
  *G01J 1/42* (2006.01)
  *G01J 1/02* (2006.01)

(52) U.S. Cl.
  CPC ..... *G02B 6/29301* (2013.01); *G02B 6/29328* (2013.01); *G02B 6/29343* (2013.01); *G02B 6/29395* (2013.01); *G02B 6/4215* (2013.01); *G02B 6/2935* (2013.01); *G02B 6/2938* (2013.01); *G02B 6/29358* (2013.01)

(56) References Cited

U.S. PATENT DOCUMENTS

| | | | |
|---|---|---|---|
| 8,559,775 B2 | 10/2013 | Babie et al. | |
| 8,626,261 B2 | 1/2014 | Ko et al. | |
| 8,818,148 B2 | 8/2014 | Boudreau et al. | |
| 8,983,250 B2 | 3/2015 | Black et al. | |
| 9,020,004 B2 | 4/2015 | Jeong | |
| 9,110,259 B1 * | 8/2015 | Black | G01J 3/36 |
| 9,348,154 B2 | 5/2016 | Hayakawa | |
| 9,620,931 B2 | 4/2017 | Tanaka | |
| 9,768,907 B2 | 9/2017 | Hironishi | |
| 9,964,703 B2 | 5/2018 | Parker et al. | |
| 10,349,492 B2 | 7/2019 | Sugiyama | |
| 10,481,333 B2 | 11/2019 | Soda | |
| 10,534,189 B2 | 1/2020 | Miller | |
| 11,064,592 B1 | 7/2021 | Bismuto et al. | |
| 11,394,464 B2 | 7/2022 | Nagarajan | |
| 2005/0111848 A1 * | 5/2005 | Grubb | G02B 6/12033 398/147 |
| 2007/0223552 A1 | 9/2007 | Muendel et al. | |
| 2008/0266639 A1 | 10/2008 | Melloni et al. | |
| 2014/0340690 A1 | 11/2014 | Lefevre | |
| 2016/0282640 A1 * | 9/2016 | Guzzon | G02B 6/29338 |

FOREIGN PATENT DOCUMENTS

| | | |
|---|---|---|
| JP | 2015068854 | 4/2015 |
| JP | 2015532848 | 11/2015 |
| JP | 2020112450 | 7/2020 |
| JP | 2020118887 | 8/2020 |
| WO | WO 14/129613 | 8/2014 |
| WO | WO 19/214244 | 11/2019 |
| WO | WO 20/039553 | 2/2020 |

OTHER PUBLICATIONS

U.S. Appl. No. 17/945,862, filed Sep. 15, 2022, Pelc et al.

He et al., "Integrated Polarization Compensator for WDM Waveguide Demultiplexers," IEEE Photonics Technology Letters vol. 11, No. 2, Feb. 1999, pp. 224-226

Anonymous, "Multi mode Interferometer," Wikipedia, retrieved from https://en.wikipedia.org/w/index.php?title=Multi_mode_interferometer&oldid=1024100316, May 20, 2021, 2 pages.

Cai et al., "Analysis of the Coupling Characteristics of a Tapered Three-Guide Coupled System," *Journal of Lightwave Technology*, IEEE, USA, vol. 8, No. 10, Oct. 1, 1990, pp. 1621-1629.

Vance et al., "Design procedures for passive planar coupled waveguide devices," *IEE Proceedings: Optoelectronics, Institution of Electrical Engineers*, Stevenage, GB, vol. 141, No. 4, Aug. 1, 1994, pp. 231-241.

Yuanmin et al., "Analysis of the Coupling Characteristics of a Tapered Three-Guide Coupled System," *Journal of Lightwave Technology*, Oct. 1990, vol. 8, No. 10, pp. 1621-1629.

* cited by examiner

SYSTEMS AND METHODS FOR WAVELENGTH LOCKING IN OPTICAL SENSING SYSTEMS

CROSS-REFERENCE TO RELATED APPLICATIONS

This application is a continuation of U.S. patent application Ser. No. 16/582,949, filed Sep. 25, 2019, which is a nonprovisional of, and claims the benefit under 35 USC 119(e) of, U.S. Patent Application No. 62/738,649, filed Sep. 28, 2018, the contents of which are incorporated herein by reference as if fully disclosed herein.

FIELD

This disclosure relates generally to optical sensing systems. More particularly, this disclosure relates to methods for wavelength locking and associated optical sensing systems.

BACKGROUND

Optical sensing systems can be useful for many applications. In some instances, it may be useful to measure the optical properties of light emitted by light sources included in the optical sensing systems. For example, the optical properties of emitted light can be monitored to ensure that a light source is tuned to a target wavelength and/or has a certain amount of wavelength stability.

In some examples, the light sources can emit light having different properties such as different wavelengths. The emitted light can propagate along one or more light paths. The optical sensing system can also include one or more multiplexers for combining the emitted light along the light paths, where the multiplexer(s) can be component(s) separate from those measuring the optical properties of the emitted light. Separate components for the two functions may increase the size, cost, and complexity of the optical sensing system.

SUMMARY

Disclosed herein is an integrated photonics device including a frequency stabilization subsystem for monitoring and/or adjusting the wavelength of light emitted by one or more light sources. The device can include one or more selectors which can combine, select, and/or filter light along one or more light paths, wherein the light can include light emitted by a plurality of light sources. Selectors may include, but are not limited to, an arrayed waveguide grating (AWG), a ring resonator, a plurality of distributed Bragg reflectors (DBRs), a plurality of filters, and the like. Output light paths from the selector(s) can be input into one or more detector(s). The detector(s) can receive the light along the light paths and can generate one or more signals as output signal(s) from the frequency stabilization subsystem. A controller can monitor the wavelength and can adjust or generate control signal(s) for the one or more light sources to lock the monitored wavelength to a target wavelength (or within a targeted range of wavelengths).

A system is disclosed which may include at least a plurality of light sources that may emit a light in response to one or more control signals, where the light may propagate along one or more first light paths, a frequency stabilization subsystem that may receive at least a portion of the one or more first light paths, where the frequency stabilization subsystem may include one or more selectors that combine, select, filter, or a combination thereof, of at least a portion of the one or more first light paths, and one or more detectors that may receive light along one or more second light paths from the one or more selectors and may generate one or more signals. In some examples, the one or more signals may be one or more outputs from the frequency stabilization subsystem. The frequency stabilization subsystem may also include a controller that may receive the one or more signals from the frequency stabilization subsystem, may determine a monitored wavelength from the one or more signals, may determine a difference between the monitored wavelength and a targeted wavelength, and may generate the one or more control signals based on the difference.

Additionally or alternatively, in some examples, the one or more selectors may include an arrayed waveguide grating (AWG), the AWG including a plurality of waveguides, where at least two of the plurality of waveguides may have different lengths. The AWG may output the light along the one or more second light paths having different phase shifts. Additionally or alternatively, in some examples, the frequency stabilization subsystem may include a plurality of attenuators coupled to the AWG and the one or more detectors, the plurality of attenuators modulating the light along the one or more second light paths at different frequencies. Additionally or alternatively, in some examples, the one or more selectors may include a first ring resonator and a second ring resonator, the first ring resonator including a first looped waveguide which may optically couple at least a portion of the one or more first light paths having a first set of wavelengths, and the second ring resonator including a second looped waveguide which may optically couple at least a portion of the one or more first light paths having a second set of wavelengths.

Additionally or alternatively, in some examples, the one or more selectors may include a distributed Bragg reflector (DBR) component, the DBR component including a first DBR having a first structure that outputs at least a portion of the one or more first light paths having a first set of wavelengths, and a second DBR that outputs the at least the portion of the one or more first light paths having a second structure that outputs a second set of wavelengths. Additionally or alternatively, in some examples, the one or more selectors may include a filter component, the filter component including a waveguide, a first filter that filters at least a portion of the one or more first light paths having a first set of wavelengths, and a second filter that filters at least a portion of the one or more first light paths having a second set of wavelengths. Additionally or alternatively, in some examples, the one or more selectors may include one or more of a resonator, a multiplexer, an echelle grating multiplexer, a Mach-Zehnder interferometer, a Fabry-Perot cavity, a nanobeam cavity, and so forth. Additionally or alternatively, in some examples, the one or more detectors may include a single detector, and the one or more selectors may be coupled to different sides of the single detector.

Additionally or alternatively, in some examples, the one or more selectors may include one or more of an arrayed waveguide grating (AWG), a resonator, a distributed Bragg reflector (DBR) component, a filter component, a multiplexer, an echelle grating multiplexer, a Mach-Zehnder interferometer, a Fabry-Perot cavity, a nanobeam cavity and so forth. Additionally or alternatively, in some examples, the one or more detectors may include a twin waveguide detector having two waveguides on a same substrate, where a spacing between the two waveguides may be less than a longitudinal dimension of a given waveguide. Additionally or alternatively, in some examples, the one or more selectors may include one or more sensors measuring a temperature of the one or more selectors and one or more heaters for adjusting the temperature of the one or more selectors. Additionally or alternatively, in some examples, the frequency stabilization subsystem may further include a multiplexer, the multiplexer receiving the one or more first light paths and outputting a third light path, the third light path being the at least the portion of the one or more first light paths, where the one or more selectors select from the third light path and output a fourth light path, the fourth light path included in the one or more outputs of the frequency stabilization subsystem. Additionally or alternatively, in some examples, the one or more selectors may select from the one or more first light paths and outputs a fourth light path, the fourth light path included in the one or more outputs of the frequency stabilization subsystem. Additionally or alternatively, in some examples, the frequency stabilization subsystem may further include a multiplexer, the multiplexer receiving the one or more first light paths and outputting a third light path, the frequency stabilization subsystem further including a splitter that receives the third light path and outputs a fourth light path and a fifth light path, the fourth light path included in the one or more outputs of the frequency stabilization subsystem, and the fifth light path being the at least the portion of the one or more first light paths.

A method for operating one or more light sources in an optical sensing system is disclosed. The method can include sending one or more control signals to one or more light sources, emitting light from the one or more light sources, where the emitted light is based on the one or more control signals, propagating at least a portion of the emitted light along one or more first light paths to a frequency stabilization subsystem, performing one or more of combining, multiplexing, filtering, and selecting at least a portion of the one or more first light paths using one or more selectors included in the frequency stabilization subsystem, receiving light along one or more second light paths by one or more detectors, generating one or more signals using the one or more detectors, the one or more signals indicative of the light along the one or more second light paths, determining a monitored wavelength from the one or more signals, determining a difference between the monitored wavelength and a target wavelength, and adjusting the one or more control signals to the one or more light sources based on the difference.

Additionally or alternatively, in some examples, the performance of one or more of combining, multiplexing, filtering, and selecting the at least the portion of the one or more first light paths may include creating a first phase shift in the at least the portion of the one or more first light paths having a first set of wavelengths using an arrayed waveguide grating (AWG) and creating a second phase shift in the at least the portion of the one or more first light paths having a second set of wavelengths using the AWG. Additionally or alternatively, in some examples, the performance of one or more of combining, multiplexing, filtering, and selecting the at least the portion of the one or more first light paths may include optically coupling at least the portion of the one or more first light paths having a first set of wavelengths using a first ring resonator and optically coupling the at least the portion of the one or more first light paths having a second set of wavelengths using a second ring resonator. Additionally or alternatively, in some examples, the method may further include determining the target wavelength by taking a ratio of the one or more signals and determining an overlapping wavelength of the one or more signals. Additionally or alternatively, in some examples, the method may further include measuring a temperature of the one or more selectors using one or more sensors, determining whether the temperature meets one or more temperature criteria, and in accordance with the temperature not meeting the one or more temperature criteria, adjusting the temperature using one or more heaters.

A method for forming an optical sensing system is disclosed. The method can include providing a plurality of light sources, the plurality of light sources emitting light that propagates along one or more first light paths, providing a controller, arranging the plurality of light sources to receive one or more control signals from the controller, forming a frequency stabilization subsystem and arranging the frequency stabilization subsystem to receive the one or more first light paths. In some examples, forming the frequency stabilization subsystem may include forming one or more selectors to combine, select, filter, or a combination thereof at least a portion of the one or more first light paths, forming and arranging one or more detectors to receive light along one or more second light paths from the one or more selectors, arranging the one or more detectors to generate one or more outputs from the frequency stabilization subsystems, and arranging and connecting the controller to the frequency stabilization subsystem and the plurality of light sources. Additionally or alternatively, in some examples, forming the one or more selectors may include forming one or more of an arrayed waveguide grating (AWG), a ring resonator, a distributed Bragg reflector (DBR) component, a filter component, a multiplexer, an echelle grating multiplexer, a Mach-Zehnder interferometer, a Fabry-Perot cavity, a nanobeam cavity, and so forth.

BRIEF DESCRIPTION OF THE DRAWINGS

The disclosure will be readily understood by the following detailed description in conjunction with the accompanying drawings, wherein like reference numerals designate like structural elements, and in which.

Figure 1A:
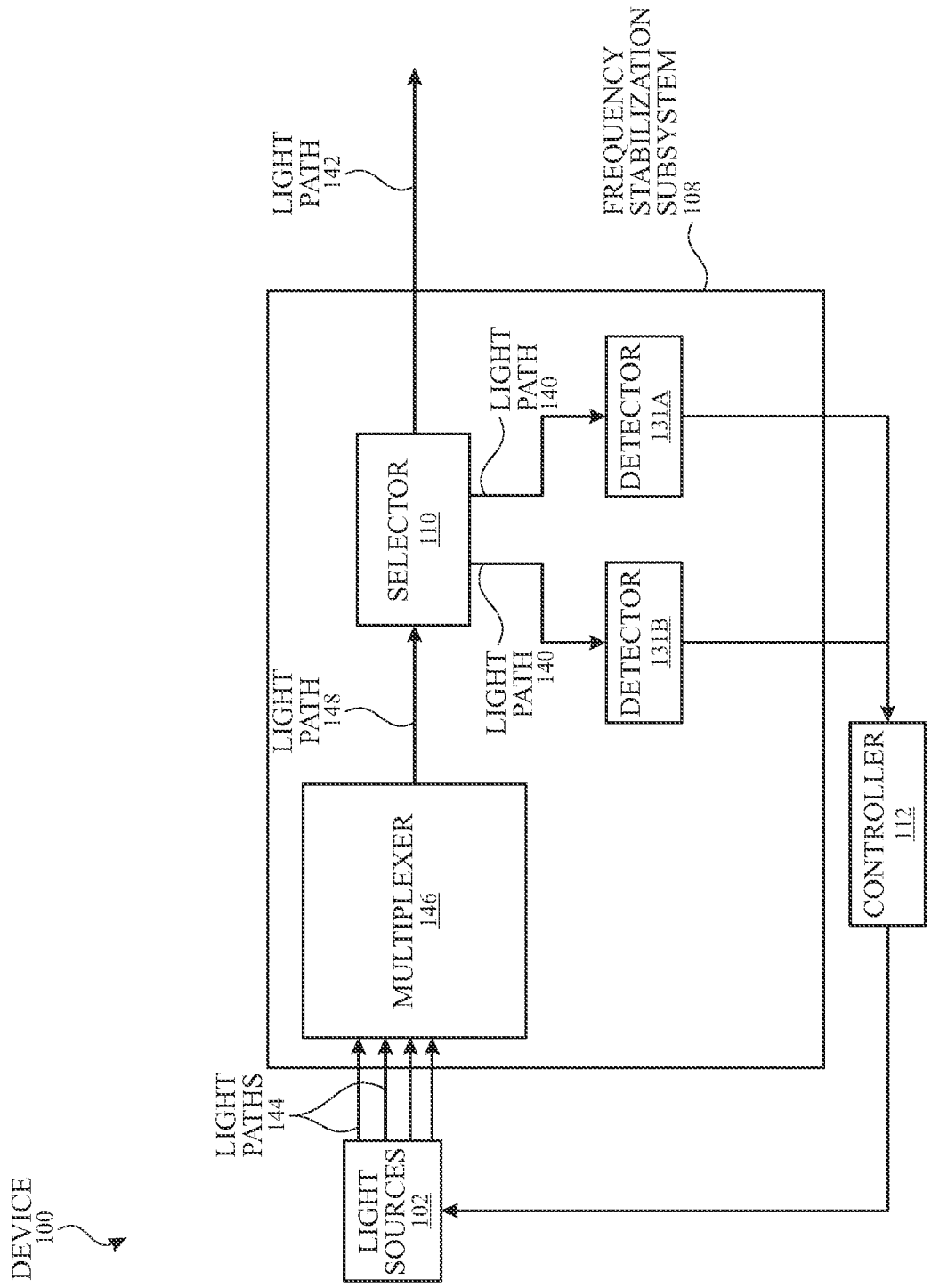
FIG. 1A illustrates a block diagram of a portion of an example integrated photonics device including a frequency stabilization subsystem, which can include a selector that selects and outputs a light path.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented between them, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

In the following description of examples, reference is made to the accompanying drawings in which are shown, by way of illustration, specific examples that can be practiced. It is to be understood that other examples can be used and structural changes can be made without departing from the scope of the various examples.

Various techniques and process flow steps will be described in detail with reference to examples as illustrated in the accompanying drawings. In the following description, numerous specific details are set forth in order to provide a thorough understanding of one or more aspects and/or features described or referenced herein. It will be apparent, however, to one skilled in the art, that one or more aspects and/or features described or referenced herein may be practiced without some or all of these specific details. In other instances, well-known process steps and/or structures have not been described in detail in order not to obscure some of the aspects and/or features described or referenced herein.

Further, although process steps or method steps can be described in a sequential order, such processes and methods can be configured to work in any suitable order. In other words, a sequence or order of steps described in this disclosure does not, in and of itself, indicate a requirement that the steps be performed in that sequence or order. Further, some steps may be performed simultaneously despite being described or implied as occurring non-simultaneously (e.g., because one step is described after the other step). Moreover, the illustration of a process by its description in a drawing does not imply that the illustrated process is exclusive of other variations and modification thereto, does not imply that the illustrated process or any of its steps are necessary to one or more of the examples, and does not imply that the illustrated process is preferred.

Various reference characters are used throughout the description for purposes of referring to one or more elements drawn in the figures. In some instances, a reference character may include numbers followed by a letter. Other reference characters may include the same numbers, but followed by a different letter. The description may refer to the group of elements by referring to the common numbers only, where no letter is appended. In such case, the reference to the group of elements means that the disclosed examples apply to one or more of the group of elements.

Disclosed herein is an integrated photonics device including a frequency stabilization subsystem for monitoring and/or adjusting the wavelength of light emitted by one or more light sources. The frequency stabilization subsystem can include selector(s) which can combine, select, and/or filter light along one or more light paths, which can include light emitted by a plurality of light sources. Example selectors may include, but are not limited to, an arrayed waveguide grating (AWG), a plurality of ring resonators, a plurality of distributed Bragg reflectors (DBRs), a plurality of filters, and the like. Output light paths from the selector(s) can be input into one or more detector(s). The detector(s) can receive the light along the light paths and can generate one or more signals as output signal(s) from the frequency stabilization subsystem. A controller can monitor the wavelength and can adjust or generate control signal(s) for the one or more light sources to lock the monitored wavelength to a target wavelength (or within a targeted range of wavelengths).

Representative applications of methods and apparatus according to the present disclosure are described in this section. These examples are being provided solely to add context and aid in the understanding of the described examples. It will thus be apparent to one skilled in the art that the described examples may be practiced without some or all of the specific details. Other applications are possible, such that the following examples should not be taken as limiting.

Example Frequency Stabilization Subsystems

In some examples, monitoring the optical properties of emitted light may employ the use of a frequency stabilization subsystem. The frequency stabilization subsystem can be used to verify whether the light sources are tuned to a target wavelength and/or have a certain amount of wavelength stability and, in some examples, make adjustments accordingly. The frequency stabilization subsystem 108 can be configured with one or more functions: multiplexing, combining, selecting, filtering, etc. In some examples, the number of components in the device 100 may include fewer or more components.

In some examples, the frequency stabilization subsystem can include a selector that selects and outputs light on a selected light path. FIG. 1A illustrates a block diagram of a portion of an example integrated photonics device including a frequency stabilization subsystem, which can include a selector that selects and outputs light on a light path. In FIG. 1A, an optical sensing system can include a device 100 which may include one or more light sources 102 and a multiplexer 146 which may be part of a frequency stabilization subsystem 108. The light sources 102 can be configured to emit light along one or more light paths 144. In some examples, the light sources 102 can be configured to emit light having different ranges of wavelengths.

The light paths 144 can be input into the frequency stabilization subsystem 108. The frequency stabilization subsystem 108 may include a multiplexer 146, a selector 110, and one or more detectors 131. The multiplexer 146 can receive the emitted light along the light path(s) 144 and can combine the emitted light to output light path 148. The light path 148 can be input to the selector 110. The selector 110 can select and output the light on light path 142, which can be one of the outputs of the frequency stabilization subsystem 108. The selector 110 can also generate outputs along the light paths 140 to the detectors 131A and 131B. The detectors 131A and 131B can receive the light paths 140 and output a signal or signals to a controller 112. Even though the detectors 131A and 131B illustrate a combined, single output to the controller 112, in some examples, an individual output from each of the detectors 131A and 131B may be output to the controller 112 such that the controller receives an output from detector 131A and an output from detector 131B.

The selector 110 can be a component that receives light via an input light path, selects light from the input light path, and outputs the selected light. In some examples, the selector 110 can output multiple light paths, which can include at least two different wavelengths (discussed below). For example, the selector 110 can receive light on the light path 148 as input and can output light along light paths 142 and 140. The selector 110 can include one or more passive components such as a filter, resonator, multiplexer, an echelle grating multiplexer, an arrayed waveguide grating (AWG), Mach-Zehnder interferometer (MZI), a Fabry-Perot cavity, a nanobeam cavity, a ring resonator, a Distributed Bragg Reflector (DBR), or the like for combining, selecting, and/or filtering light. The terms "frequency stabilization" and "frequency stabilization subsystem" as used throughout this disclosure can refer to frequency stabilization, wavelength tuning, or both.

The detectors 131 can include any type of diode that can respond to or measure photons impinging on its active area. The detectors 131 can generate one or more signals indicative of the light along the light paths 140; these one or more signals can be an output signal or output signals from the frequency stabilization subsystem 108 to the controller 112, for example.

Although FIG. 1A illustrates the multiplexer 146 as included in the frequency stabilization subsystem 108, examples may include the multiplexer 146 as being a component separate from the frequency stabilization subsystem 108 (not shown in FIG. 1A). Examples of the device 100 can further include one or more additional components, such as filters, amplifiers, analog-to-digital converters (ADCs), etc. (not shown) located between the detector(s) and the controller 112. These additional components can perform one or more operations on or with the signals from the detector(s) such as processing the signals, amplifying the signals, performing one or more calculations or comparisons, and so forth.

The signal(s) from the frequency stabilization subsystem 108 can be used as feedback in, for example, a control loop. The device 100 can also include a controller 112 that can receive and analyze the signal(s) from the frequency stabilization subsystem 108. The controller 112 can generate one or more signals that can be inputs to the light sources 102. In some examples, the analysis can include monitoring the wavelength of the emitted light as discussed herein and determining the difference between the monitored wavelength and a target wavelength. The controller 112 may be configured to lock the monitored wavelength to the target wavelength.

The signal(s) from the frequency stabilization subsystem 108 can be the same signals used to control the light sources 102 (e.g., control signal(s)) and the properties of light emitted by the light sources 102 along the light paths 144. In some examples, the signal(s) from the frequency stabilization subsystem 108 can be indicative of changes in one or more properties (e.g., temperature, current, etc.) of the light sources 102. The changes may be associated with locking the monitored wavelength to the target wavelength. In some examples, the controller 112 can use other information (e.g., measured temperature of the light sources 102) in generating the signal(s).

Figure 1B:
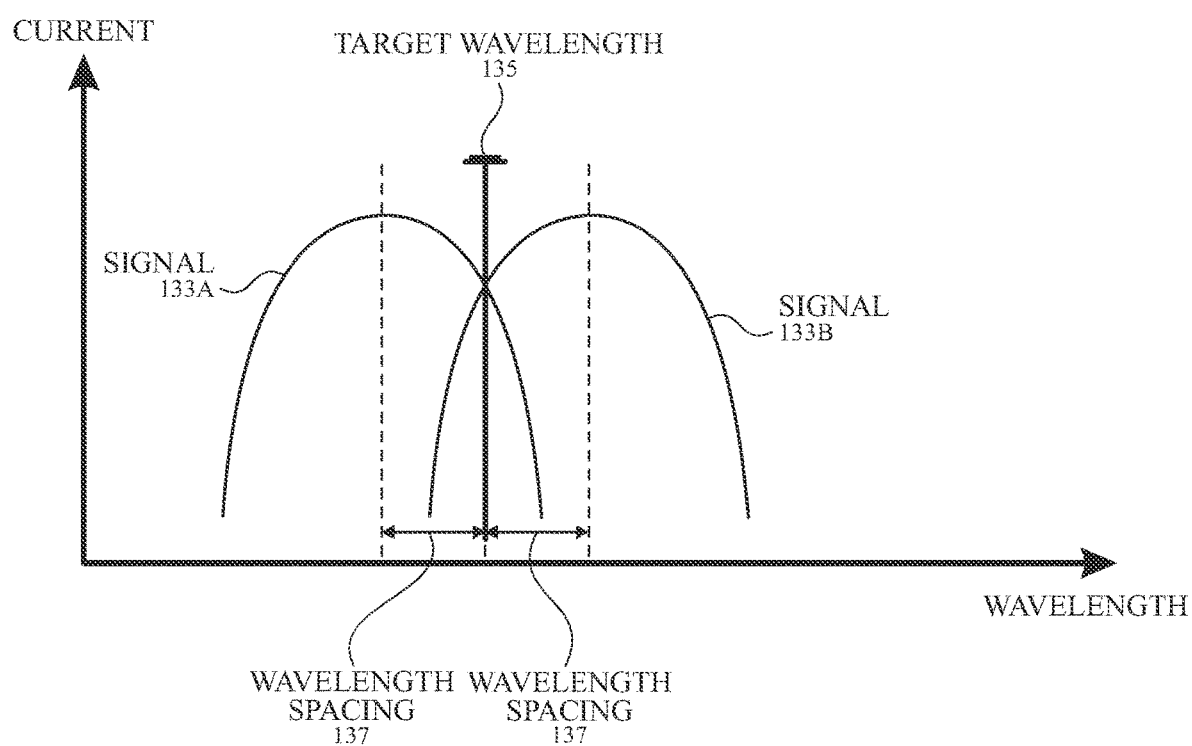
FIG. 1B illustrates an example plot of multiple signals and a target wavelength.

In some examples, the frequency stabilization subsystem 108 outputs multiple signals to the controller 112. In such instances, the controller 112 can lock the wavelength at or near the crossing points (e.g., overlap) of the signals, as shown in FIG. 1B. In some examples, the wavelength locking may occur near the crossing points so long as signals 133A and B exceed the target signal to noise ratio. Although not illustrated in FIG. 1B, in some examples, the wavelength outputs may generally approximate a Gaussian curve. The selector 110 can select light on light paths (from the input light path 148) that include sets of wavelengths. In some examples, at least two light paths can include one or more different wavelengths and one or more common wavelengths. A target wavelength 135 can be included in the common wavelength(s), and the selector 110 can select the light on the light paths, such that the range of wavelengths is close to the target wavelength 135. For example, the selector 110 can select a first light path associated with signal 133A and a second light path associated with signal 133B. Signal 133A can be the signal generated by the detector 131A (in FIG. 1A), and signal 133B can be the signal generated by the detector 131B (in FIG. 1A). The first set of wavelengths may include wavelengths shorter than the target wavelength 135, and the second set of wavelengths may include wavelengths longer than the target wavelength 135.

The signals may have an intensity that varies with wavelength, and a maximum intensity (e.g., maximum current value) located at one of the wavelengths. The difference between the wavelength of the maximum intensity and the target wavelength 135 can be referred to as a wavelength spacing 137. Although FIG. 1B shows the wavelength spacings 137 for both signals 133A and 133B as being the same, examples may include different wavelength spacings 137. In instances where the wavelength spacings 137 may differ from one another, the ratio of the signals may affect the location of the target wavelength 135.

The controller 112 can receive the associated signals 133 and can lock the monitored wavelength to the target wavelength 135, and the target ratio can be determined by taking the ratio of the signals 133A and 133B. If the monitored wavelength is not within a certain threshold wavelength from the target wavelength 135, the controller 112 can adjust or send a new signal to the light sources 102 (or another controller that controls the light sources 102).

In some instances, the light sources 102 may emit light from at least two of the light sources at different times. For example, the light sources 102 can be activated sequentially, one at a time. The frequency stabilization subsystem 108 can monitor the wavelength of the emitted light, and the controller 112 can adjust the individual signals to one or more light sources. Alternatively, the controller 112 can receive signals from the detectors sequentially, and the controller can adjust the signals to the light sources in response to the plurality of sequentially received signals from the detectors.

Although FIG. 1B illustrates the target wavelength 135 as being a single wavelength, examples may include a target range of wavelengths. In some instances, the target wavelength 135 may change during device operation, and the device 100 can be configured for locking to different target wavelengths at different times. Additionally or alternatively, the device can lock the monitored wavelength to a target ratio (which can be the ratio of the signals from the detectors). The target ratio may, in some examples, be different at different times.

Figure 2:
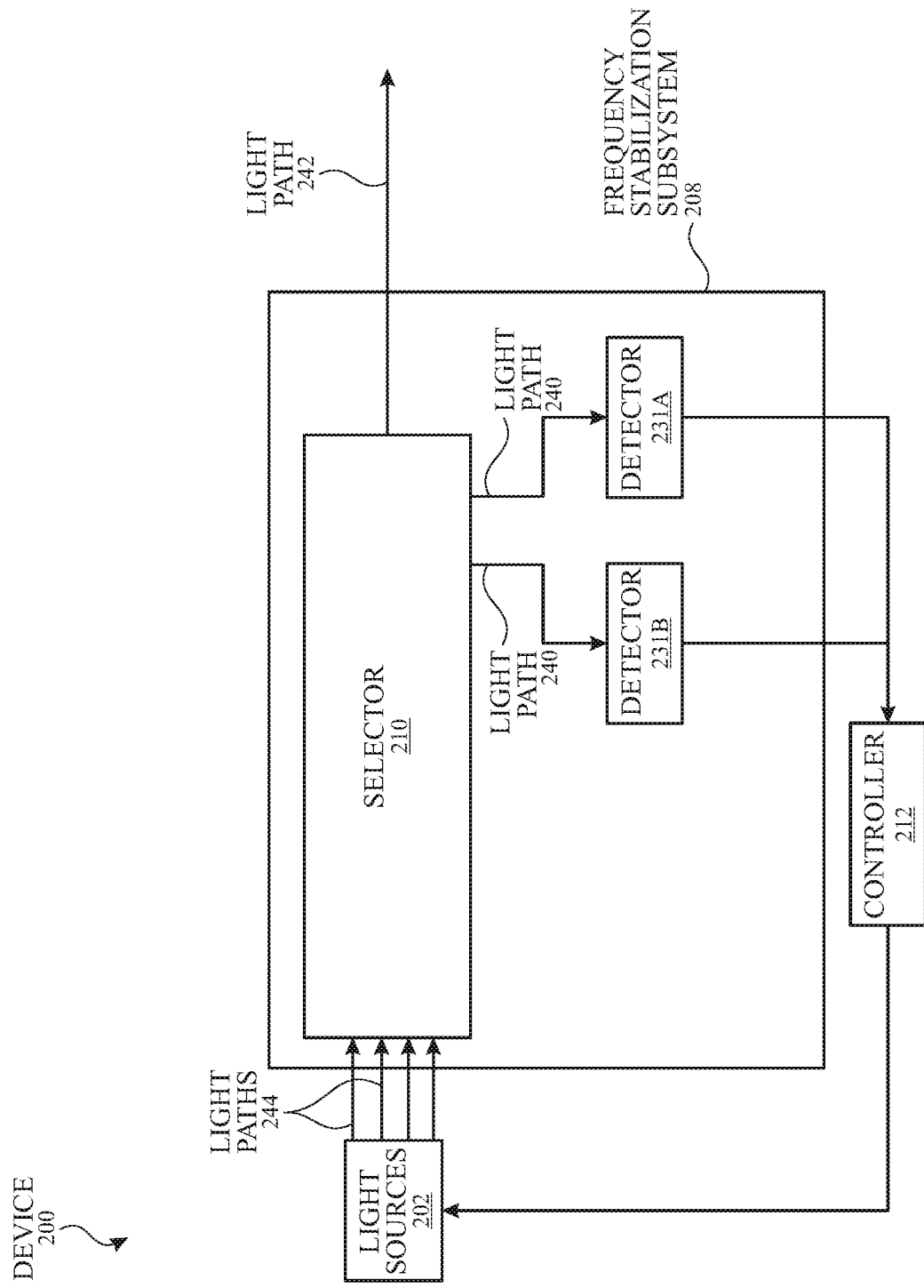
FIG. 2 illustrates a block diagram of a portion of an example integrated photonics device including a frequency stabilization subsystem, which can include a selector that combines multiple input light paths and outputs a selected light path.

In some examples, the frequency stabilization subsystem can include a selector that combines the input light on light paths along with selecting and outputting light on a selected light path. FIG. 2 illustrates a block diagram of a portion of an example integrated photonics device including a frequency stabilization subsystem, which can include a selector that combines light on multiple input light paths and outputs light on a selected light path. The device 200 can include one or more light sources 202 and a frequency stabilization subsystem 208. The light sources 202 and its output light paths 244 can be correspondingly similar in functionality and structure as the light sources 102 and the light paths 144 of FIG. 1A, respectively.

Light on the light paths 244 can be input into the frequency stabilization subsystem 208. The frequency stabilization subsystem 208 can include a selector 210 and one or more detectors 231. The detectors 231 can be correspondingly similar in functionality and structure as the detectors 131 of FIG. 1A.

The selector 210 can be configured with multiple functions, such as the functions of the multiplexer 146 and the selector 110 of FIG. 1A. The selector 210 can receive the emitted light along the light paths 244 and can combine the emitted light. The selector 210 can select from the light combined on the emitted light path and output the selected light on light path 242, which can be one of the outputs of the frequency stabilization subsystem 208. The selector 210 can also output light along the light paths 240 to the detectors 231A and 231B, and the detectors 231A and 231B can output signals to a controller 212. The controller 212 can be correspondingly similar in functionality and structure as controller 112 of FIG. 1A. Although the output signals of detectors 231A and 231B are illustrated in FIG. 2 as being combined before being received by controller 212, in some examples, the output signals of detectors 231A and 231B may be individual output signals separately received by the controller 212.

Figure 3:
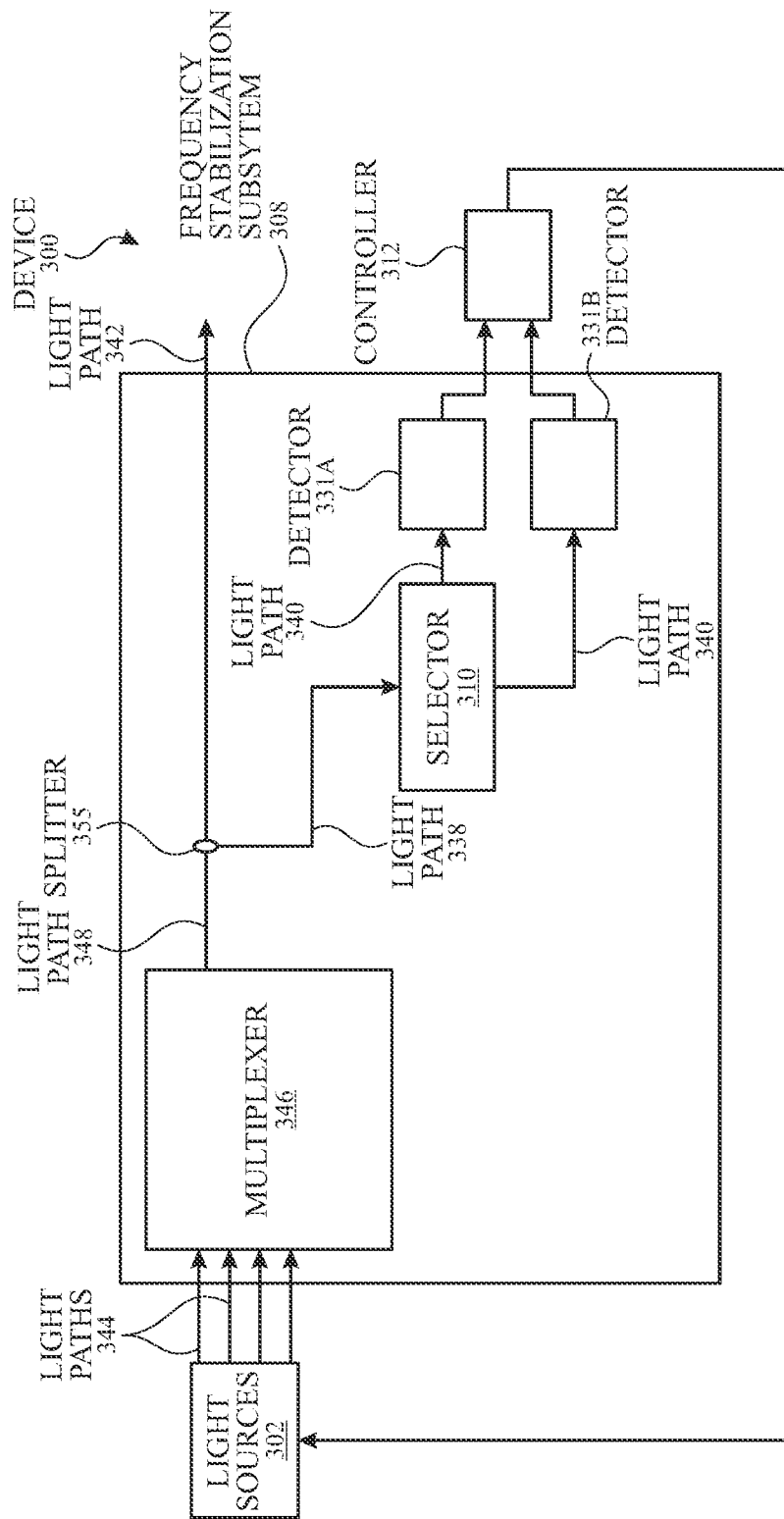
FIG. 3 illustrates a block diagram of a portion of an example integrated photonics device including a frequency stabilization subsystem, which can include a selector that receives light paths from a splitter.

In some examples, the frequency stabilization subsystem can include a selector that receives light paths from a splitter. FIG. 3 illustrates a block diagram of a portion of an example integrated photonics device including a frequency stabilization subsystem, which can include a selector that receives light paths from a splitter. The device 300 can include one or more light sources 302 and a frequency stabilization subsystem 308. The light sources 302 and its output light paths 344 can be correspondingly similar in functionality and structure as the light sources 102 and 144 of FIG. 1A, respectively.

The light paths 344 can be input into the frequency stabilization subsystem 308. The frequency stabilization subsystem 308 can include a multiplexer 346, a splitter 355, a selector 310, and one or more detectors 331. The multiplexer 346 and the detectors 331 can be correspondingly similar in functionality and structure as the multiplexer 146 and detectors 131 of FIG. 1A, respectively.

The multiplexer 346 can receive the emitted light along the light paths 344 and can combine the emitted light on light path 348. The light path 348 can be input to the splitter 355. The splitter can split the light on light path 348 to output light on light path 342 and light path 338. The light path 342 can be one of the outputs of the frequency stabilization subsystem 308.

The light path 338 can be input to the selector 310. The selector 310 can generate outputs of light along the light paths 340 to the detectors 331A and 331B. The detectors 331 can receive the light paths 340 and can output signals to a controller 312. The controller 312 can be correspondingly similar in functionality and structure as controller 112 of FIG. 1A.

The splitter 355 can split the light along the light path 348 such that light along the light path 348 has a different proportion of light intensity than the light along the light path 338. In some examples, the split can be such that light along the light path 338 includes a lower proportion (of light from the light path 348) than light along the light path 342. For example, the light path 338 can include less than 10% of light from the light path 348, and the light path 342 can include more than 90% of light from the light path 348.

Although FIG. 3 illustrates the multiplexer 346 as included in the frequency stabilization subsystem 308, examples of the disclosure can include the multiplexer 346 as being a component separate from the frequency stabilization subsystem 308. Examples of the disclosure can further include one or more additional components, such as filters, amplifiers, analog-to-digital converters (ADCs), etc. (not shown) located between the detector(s) and the controller 312. These additional components can perform one or more operations on or with the signals from the detector(s) such as processing the signals, amplifying the signals, performing one or more calculations or comparisons, or any combination thereof, and so forth.

Figure 4:
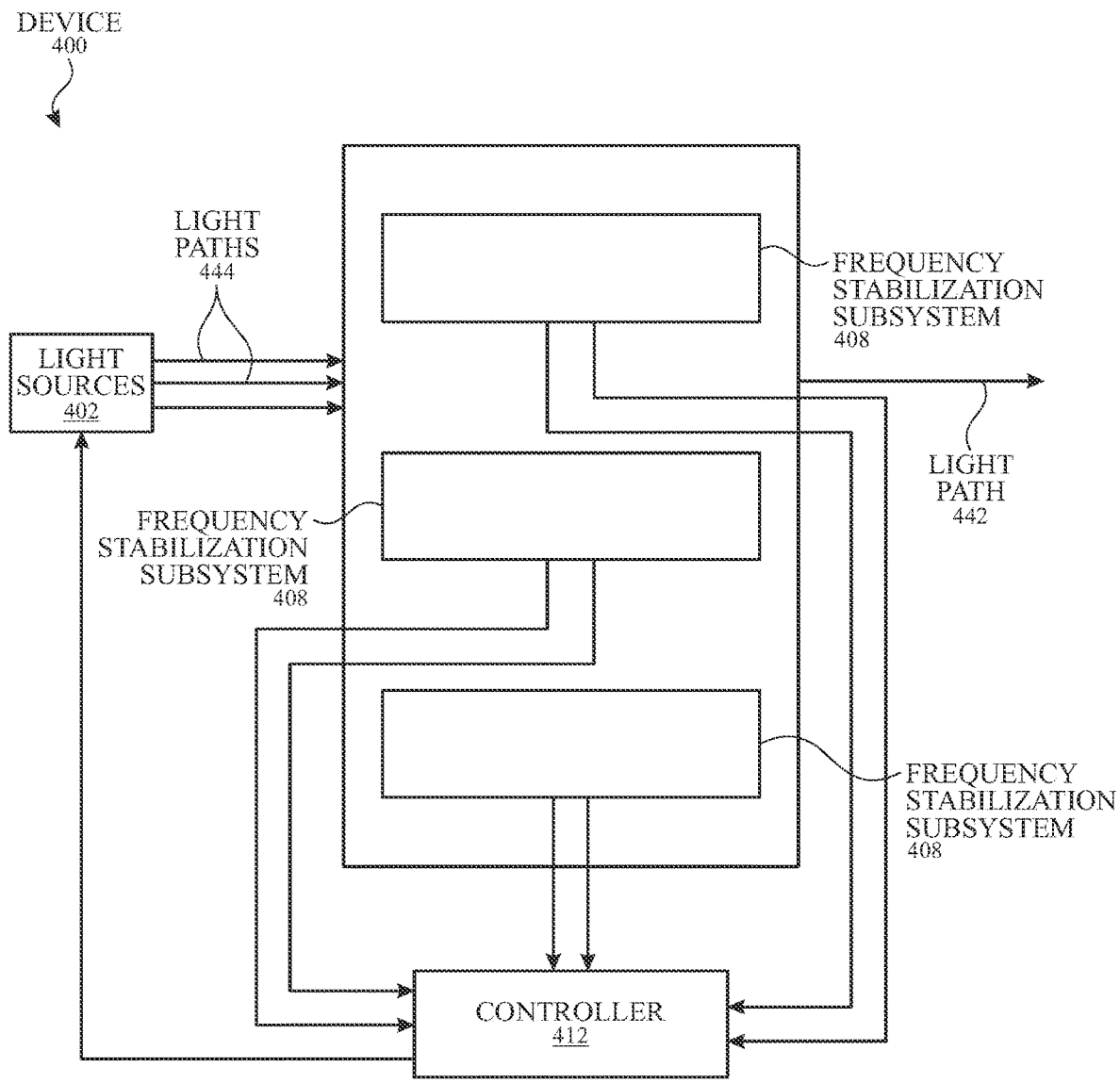
FIG. 4 illustrates a block diagram of an example device including multiple frequency stabilization subsystems.

In some examples, the device can include multiple frequency stabilization subsystems for monitoring the wavelength of light emitted by multiple light sources, as shown in FIG. 4. Device 400 can include light sources 402, a plurality of frequency stabilization subsystems 408, and a controller 412 that are correspondingly similar in functionality and structure as device 100 (or device 200 or 300), light sources 102 (or light sources 202 or 302), frequency stabilization subsystems 108 (or frequency stabilization subsystems 208 or 308), and controller 112 (or controller 212 or 312), respectively of FIGS. 1A, 2, and/or 3. Similarly, light paths 444 and light path 442 can be correspondingly similar in functionality and structure as the light paths 144 (or light paths 244 or 344) of FIGS. 1A, 2, and/or 3. Although the frequency stabilization subsystems may be illustrated in FIG. 4 as separate elements which are not communicating, in some examples, the frequency stabilization subsystems may be configured to communicate with one another as well as with other elements of device 400.

Selector

Figure 5A:
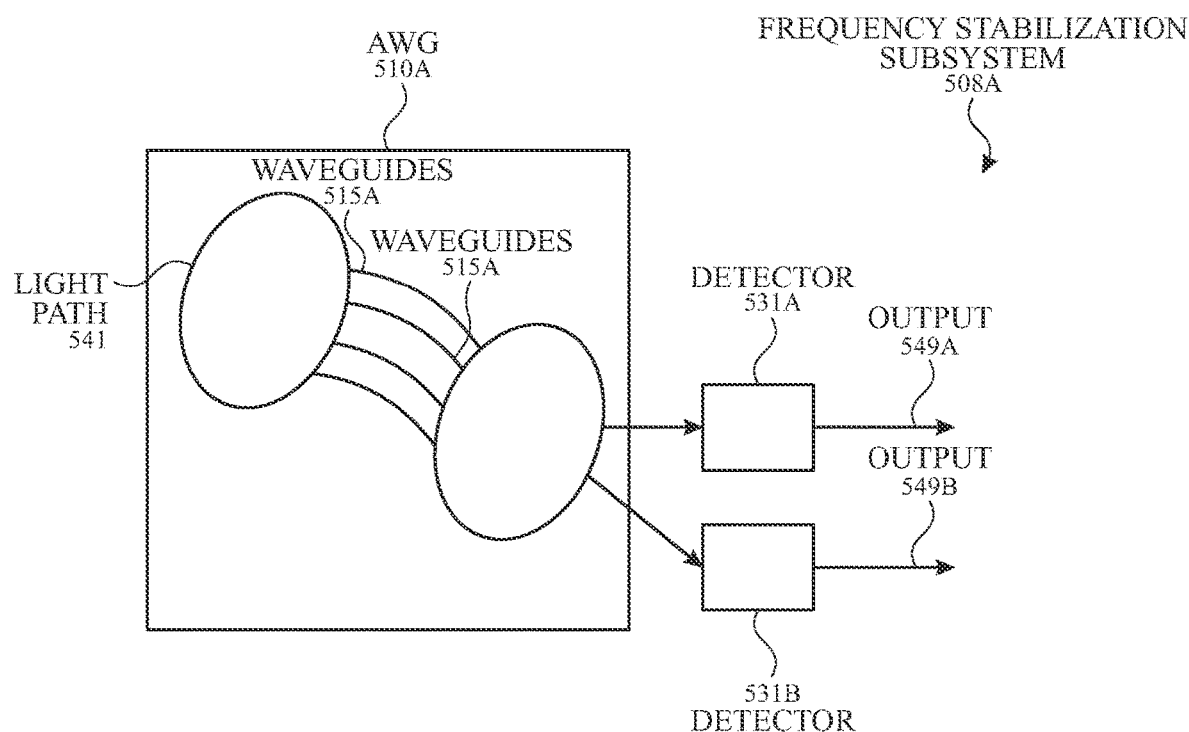
FIGS. 5A-5B illustrate block diagrams of example frequency stabilization subsystems including an arrayed waveguide grating and multiple detectors.

Examples of the disclosure can include a selector that includes an AWG. FIG. 5A illustrates a block diagram of a portion of an example frequency stabilization subsystem including an AWG and multiple detectors. Frequency stabilization subsystem 508A can receive one or more light paths 541 as inputs and can generate one or more outputs, such as output 549A, and output 549B. In some examples, the frequency stabilization subsystem 508A can include AWG 510A and detectors 531A and 531B. The detectors 531 can be correspondingly similar in function and structure as detectors 131 of FIG. 1A.

The AWG 510A can include a plurality of waveguides 515A, where at least two waveguides can have different lengths. The phase shift induced by the different waveguides 515A of different lengths can vary. The outputs of the AWG 510A can have different phase shifts, which may be wavelength dependent. The light path 541 can include light having a plurality of wavelengths and can be multiplexed using the AWG 510A. One output from the AWG 510A, such as the one received by the detector 531A, may include a first set of wavelengths, and another output from the AWG 510B, such as the one received by the detector 531B, may include a second set of wavelengths. For example, the output 549A can include a first set of wavelengths, and the output 549B can include a second set of wavelengths, where the first and second sets can include wavelengths that are different from the other set in addition to wavelengths that are common. In some examples, the sets of wavelengths can have a non-zero wavelength spacing (e.g., wavelength spacing 137 illustrated in FIG. 1B) from the target wavelength (e.g., target wavelength 135 illustrated in FIG. 1B).

The detector 531A and the detector 531B may receive light from the AWG 510A and may generate signals indicative of the measured light. The signals may be transmitted along the output 549A and the output 549B. In some examples, the signals may be current signals. A controller (e.g., controller 112 illustrated in FIG. 1A) may receive the output signals, may take the ratio of the signals, and may lock the monitored wavelength to a targeted wavelength by transmitting a signal to the light sources which may provide an adjustment to the light sources, for example, light sources 102 of FIG. 1A.

Figure 5B:
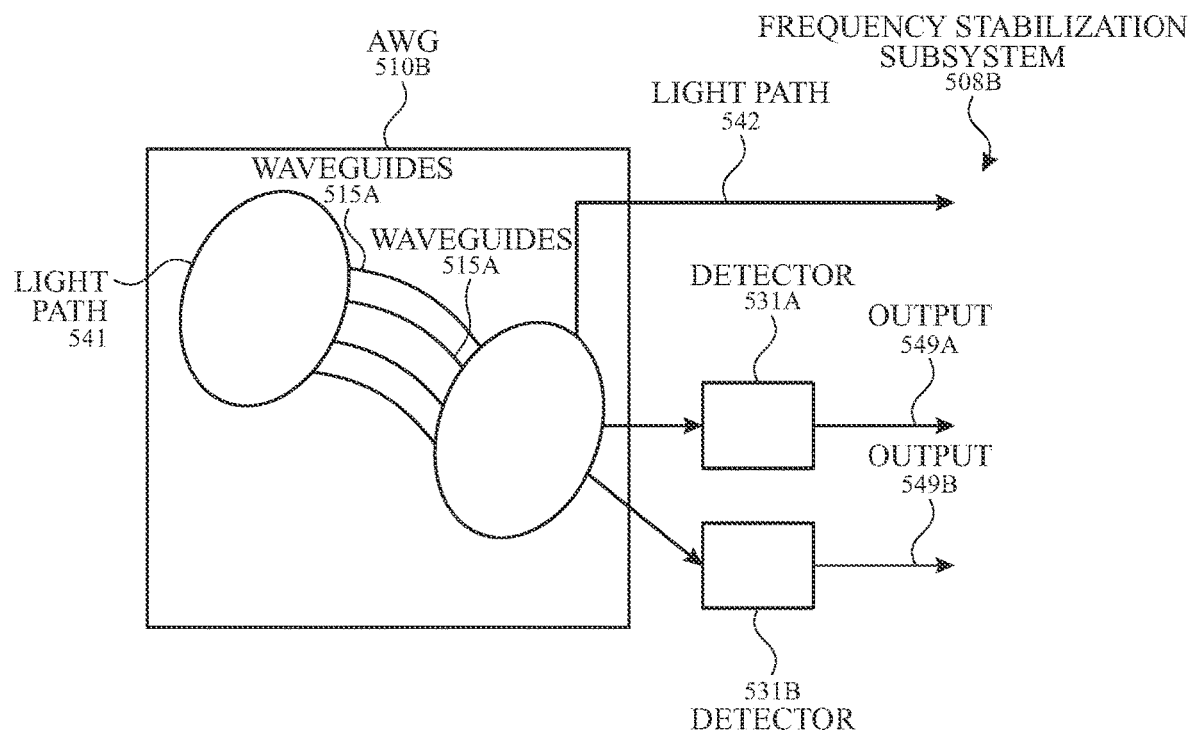

In some instances, the AWG may also output light along a light path, as shown in FIG. 5B. Frequency stabilization subsystem 508B may include an AWG 510B, which may be a selector that is configured to output light on a selected light path such as the light path 542. The light path 542 may be an output of the frequency stabilization subsystem 508B. The AWG 510B can receive light on multiple light paths as inputs. For example, the light paths 144 of FIG. 1A or the light paths 244 of FIG. 2 may be connected to the light paths 541.

Figure 6:
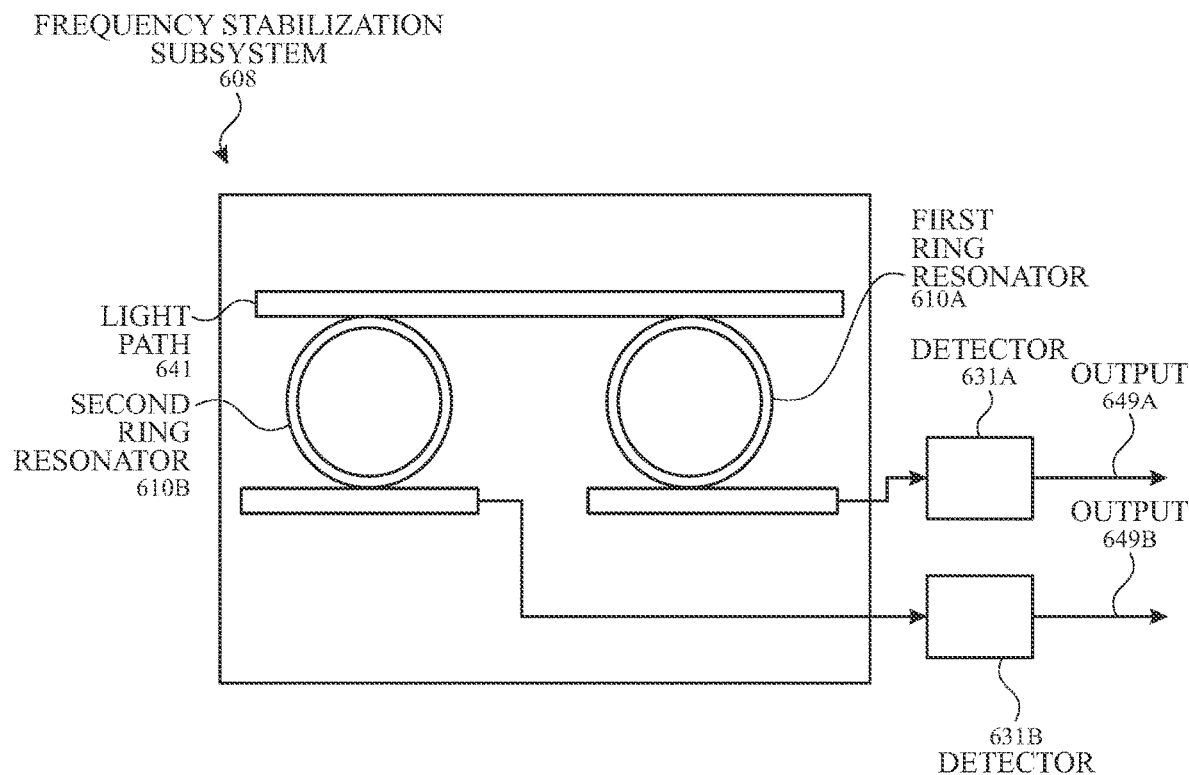
FIG. 6 illustrates a block diagram of an example frequency stabilization subsystem including ring resonators and multiple detectors.

As discussed herein, the selector in the frequency stabilization subsystem can include a ring resonator. FIG. 6 illustrates a block diagram of a portion of an example frequency stabilization subsystem including one or more ring resonators and multiple detectors.

Frequency stabilization subsystem 608 can receive one or more light paths 641 as inputs and can generate one or more outputs, such as output 649A and output 649B. The frequency stabilization subsystem 608 can include a first ring resonator 610A, a second ring resonator 610B, and a plurality of detectors 631A and 631B. The detectors 631 can be correspondingly similar in function and structure as detectors 131 of FIG. 1A.

The ring resonators 610 can include waveguides. At least one waveguide can be a looped optical waveguide. At least one waveguide can be an input waveguide that receives the light path 641 as input, and two or more waveguides can be output waveguides. In some examples, the input and output waveguides may include the same structure.

Light from the light path 641 can travel through the input waveguide, and light can optically couple to a given output waveguide depending on its respective resonant mode. The first ring resonator 610A can optically couple light having a first set of wavelengths and can output the light to the detector 631A. The second ring resonator 610B can optically couple light having a second set of wavelengths and can output the light to the detector 631B. In this manner, both the first ring resonator 610A and the second ring resonator 610B can filter certain wavelengths of light which may pass through the ring resonators from the light path 641.

The detector 631A and the detector 631B may receive light from the first ring resonator 610A and the second ring resonator 610B, respectively, and may generate signals indicative of the monitored light. The signals may be transmitted along output 649A and output 649B. In some examples, the signals may be current signals. A controller, for example, the controller 112 illustrated in FIG. 1A, may receive the signals, may take the ratio of the signals, and may lock the monitored wavelength to a targeted wavelength by transmitting a signal to the light sources which may provide an adjustment to the light sources, for example, light sources 102 of FIG. 1A. In some examples, multiple sets of ring resonators may be employed in the frequency stabilization subsystem. Different sets of ring resonators may have waveguides with different properties, such that different sets can be used at different times.

Figure 7A:
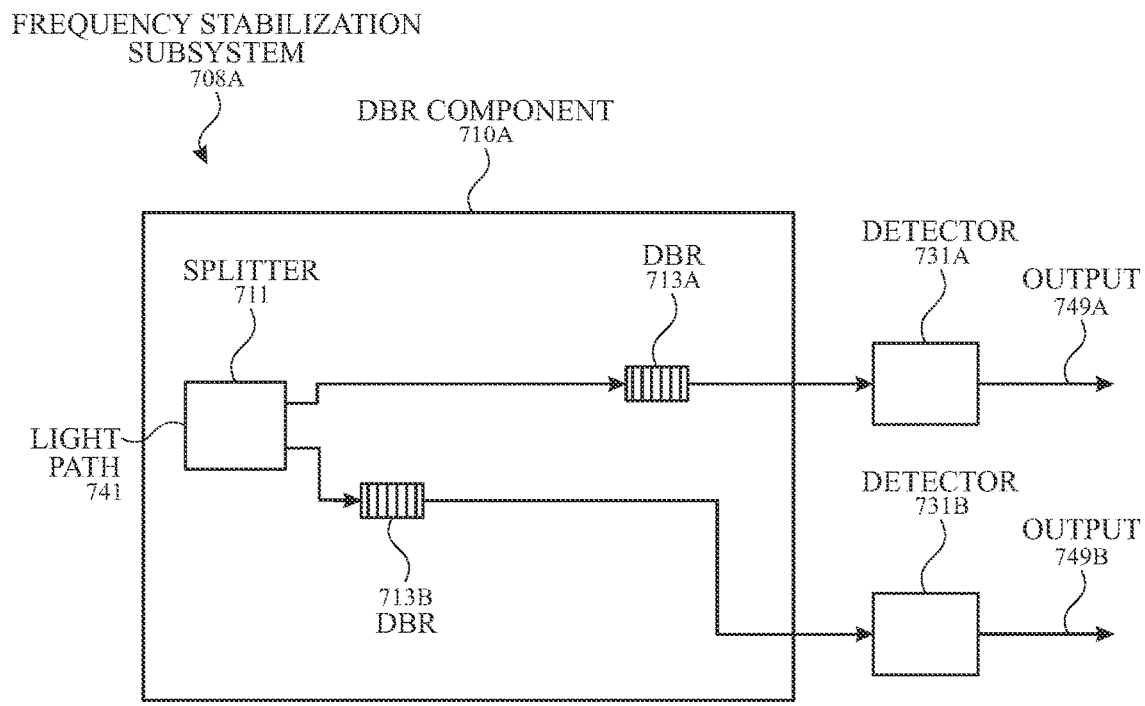
FIGS. 7A-7B illustrate block diagrams of example frequency stabilization subsystems including a distributed Bragg reflector and multiple detectors.

The selector in the frequency stabilization subsystem may also include a DBR component. FIG. 7A illustrates a block diagram of a portion of an example frequency stabilization subsystem including a DBR component and multiple detectors. Frequency stabilization subsystem 708A can receive light on one or more light paths 741 as input and can generate one or more outputs, such as output 749A and output 749B. The frequency stabilization subsystem 708A can include a DBR component 710A and the detectors 731A and 731B. The detectors 731 can be correspondingly similar in function and structure as detectors 131 of FIG. 1A.

In some examples, the DBR component 710A can include a splitter 711 and a plurality of DBRs 713. The splitter 711 can split the light received along the light path 741 into multiple outputs that can be received by the DBRs 713. An example splitter can include, but is not limited to, a Y-junction splitter, a multi-mode interference (MMI) splitter, a directional coupler splitter, and the like. In some examples, the splitter 711 can split the input into any proportion such as 50% of the light along the light path 741 to DBR 713A and 50% of the light along the light path 741 to DBR 713B. The DBRs 713 can be configured as filters that allow certain wavelengths to propagate in its structure. The DBRs 713 can include a structure comprising multiple layers of materials having different refractive indices or different periodic characteristics. In some examples, the DBR 713A may be configured as a different structure than the DBR 713B, where the output to the detector 731A can include a first set of wavelengths, and the output to detector 731B can include a second set of wavelengths. For example, the DBR 713A may include a stack of dielectric layers with different refractive indices than the stack of dielectric layers of the DBR 713B.

The detector 731A and the detector 731B may receive light from the DBR component 710A and may generate signals indicative of the measured light. The signals may be transmitted along output 749A and output 749B. In some examples, the signals may be current signals. A controller (e.g., controller 112 illustrated in FIG. 1A) may receive the signals, take the ratio of the signals, and lock the monitored wavelength to the target wavelength by transmitting a signal to the light sources which may provide an adjustment to the light sources, for example, light sources 102 of FIG. 1A.

Figure 7B:
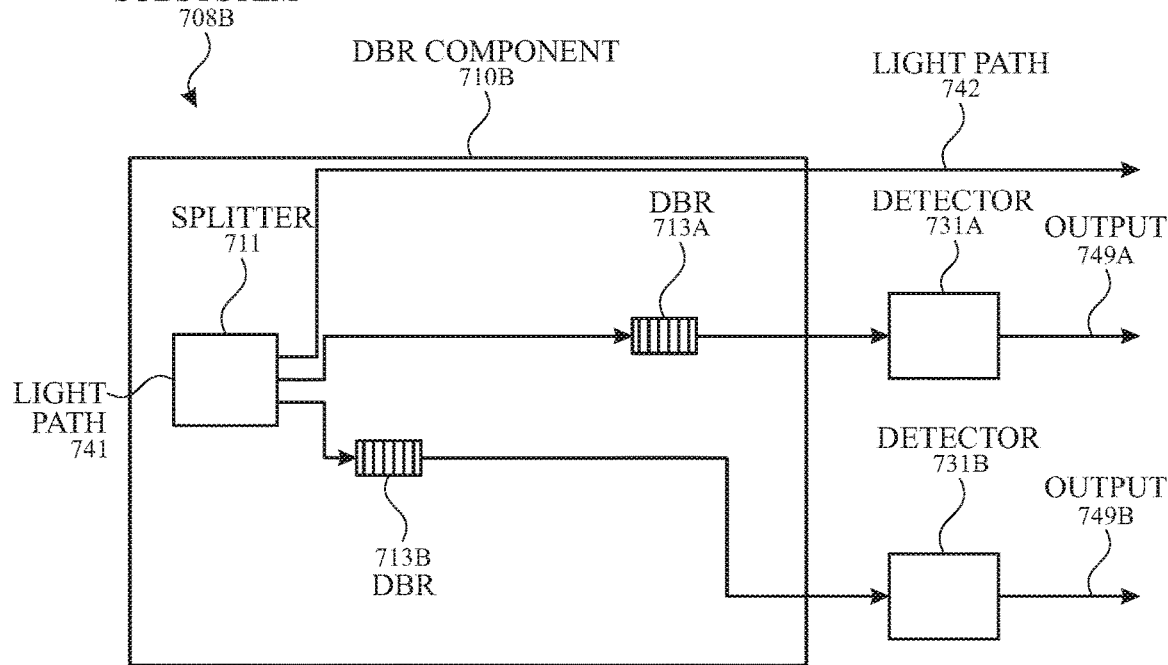

In some instances, the DBR component may also output light along a light path, as shown in FIG. 7B. Frequency stabilization subsystem 708B may include a DBR component 710B, which may be a selector that is configured to output a selected light path as the light path 742. The light path 742 may be an output of the frequency stabilization subsystem 708B. The DBR component 710B can receive light on multiple light paths as inputs. For example, the light paths 144 of FIG. 1A or the light paths 244 of FIG. 2 may be connected to the light paths 741 of FIG. 7.

Figure 8A:
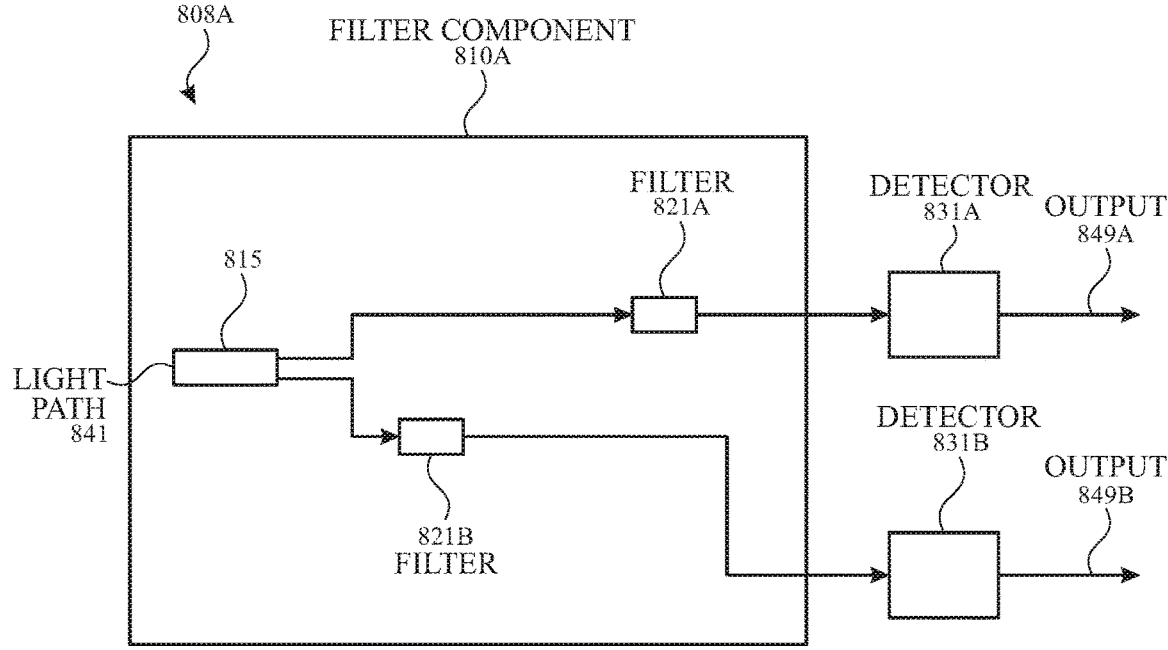
FIGS. 8A-8B illustrate block diagrams of example frequency stabilization subsystems including a filter component and multiple detectors.

The selector in the frequency stabilization subsystem may also include a filter component. FIG. 8A illustrates a block diagram of an example frequency stabilization subsystem which may include a filter component and multiple detectors. Frequency stabilization subsystem 808A can receive light on one or more light paths 841 as inputs and can generate one or more outputs, such as output 849A and output 849B. The frequency stabilization subsystem 808A can include a filter component 810A and detectors 831A and 831B. The detectors 831 can be correspondingly similar in function and structure as detectors 131 of FIG. 1A.

In some examples, the filter component 810A can include an optical component 815 and a plurality of filters 821. In some examples, the optical component 815 can include a waveguide and a DBR, which can output a first set of light to the filter 821A and a second set of light to the filter 821B. The filter 821A can filter the light to output a first set of wavelengths to the detector 831A, and the filter 821B can filter the light to output a second set of wavelengths to the detector 831B. The detector 831A and the detector 831B may receive light from the filter component 810A and may generate signals indicative of the measured light. The signals may be transmitted along output 849A and output 849B. In some examples, the signals may be current signals. A controller (e.g., controller 112 illustrated in FIG. 1A) may receive the signals, take the ratio of the signals, and lock the monitored wavelength to a target wavelength by transmitting a signal to the light sources which may provide an adjustment to the light sources, for example, light sources 102 of FIG. 1A.

Figure 8B:
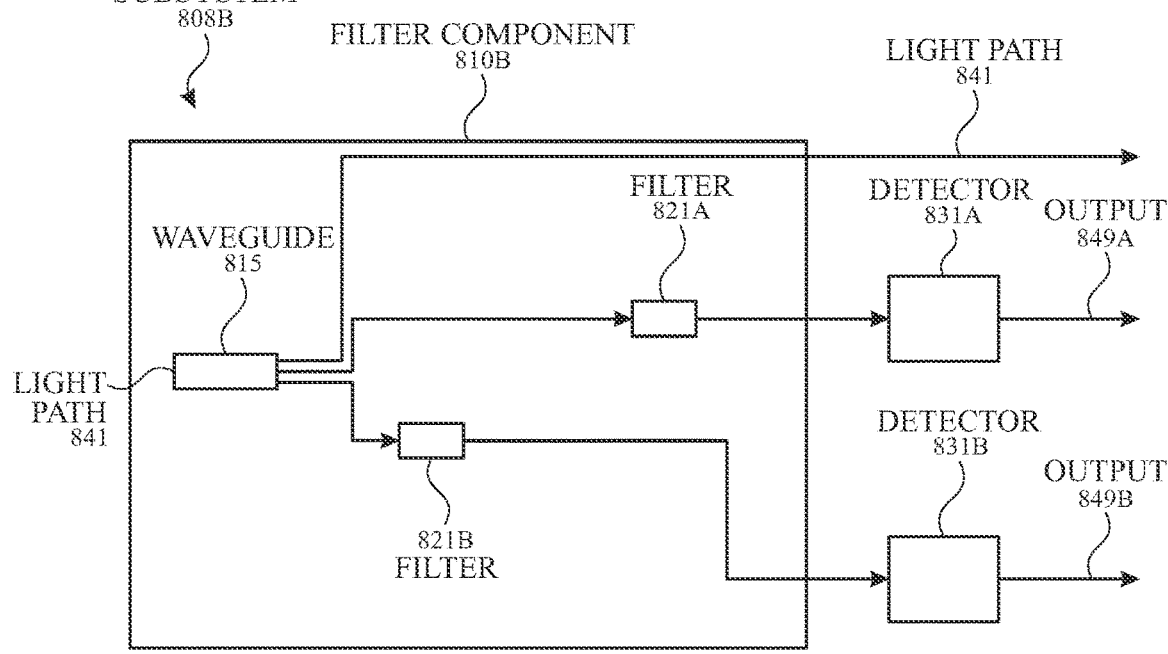

In some instances, the filter component may also output light along a light path, as shown in FIG. 8B. Frequency stabilization subsystem 808B may include a filter component 810B, which may be a selector that is configured to output light on a selected light path such as the light path 841. The light path 841 may be an output of the frequency stabilization subsystem 808B. The filter component 810B can receive multiple light paths as inputs. For example, the light paths 144 of FIG. 1A or the light paths 244 of FIG. 2 may be connected to the light paths 841.

As discussed herein, the illustrated block diagrams do not limit the configuration (e.g., location, size, orientation, etc.) of the optical routing lines and components. Examples of the disclosure can include other types of configurations not illustrated explicitly in the figures. Additionally or alternatively, the detector can be any type of detector, such as one that is discrete from the other components included in the frequency stabilization subsystem, or the detector may be an integrated component that is inseparable from the other components.

Operation of the Optical Sensing System

Figure 9:
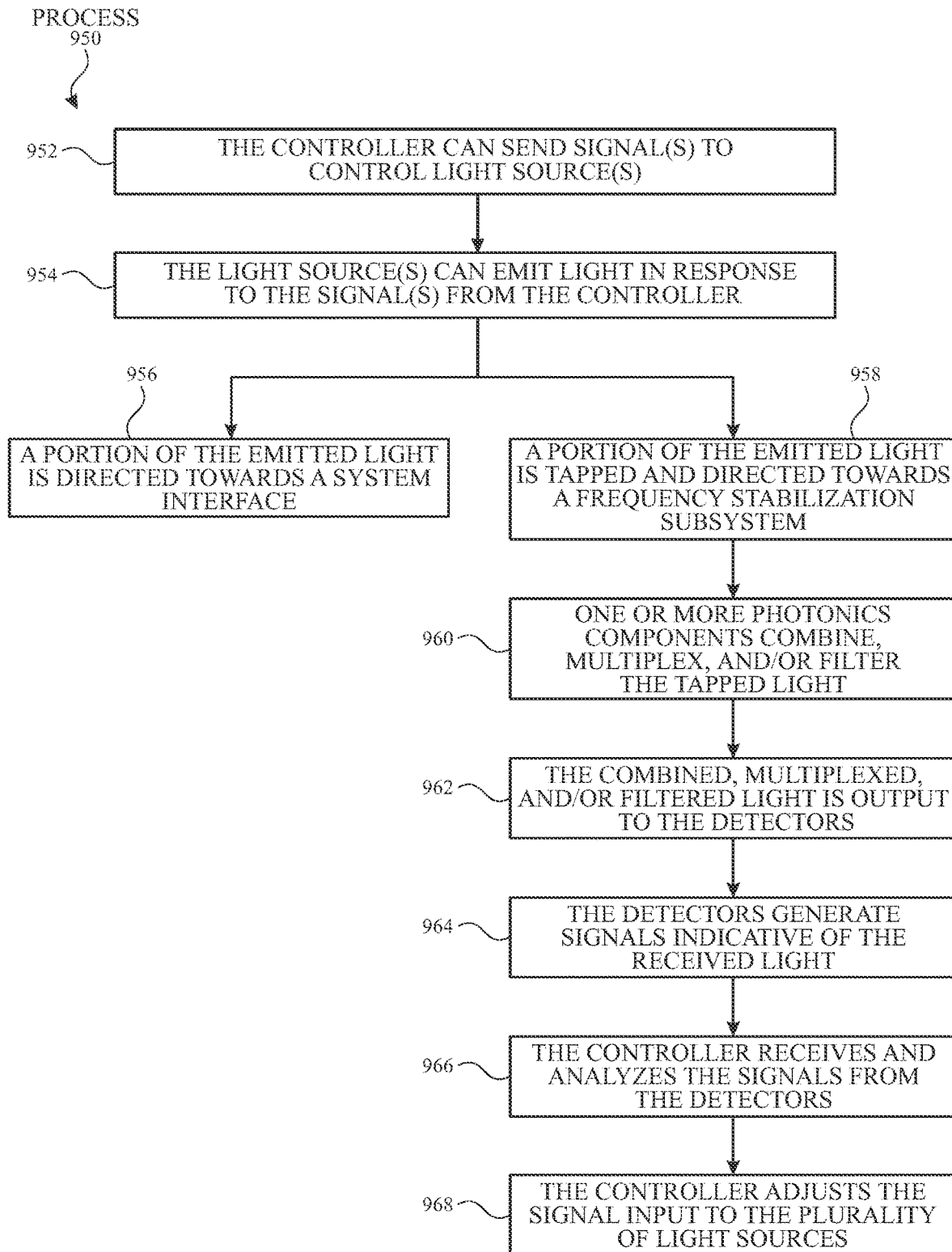
FIG. 9 illustrates a flow chart of an example operation of an optical sensing system having multiple detectors.

FIG. 9 illustrates a flow chart of an example operation of an optical sensing system having multiple detectors. At 952 of the process 950, the controller can send one or more signals that control a plurality of light sources and at 954, the plurality of light sources can receive the signal(s) and can emit light in response. The one or more signals from the controller can be indicative of one or more targeted properties of the light emitted by the plurality of light sources. At 956 of process 950, a portion of the light emitted by the plurality of light sources can be directed using optics towards a system interface and at 958 another portion of the light (e.g., tapped light) emitted by the plurality of light sources can be directed towards a frequency stabilization subsystem.

At step 960 of process 950, one or more selectors included in the frequency stabilization subsystem can combine, multiplex, select, and/or filter at least a part of the tapped light and at 962, the selector can output light to the detectors. The light output to the detectors can have one or more unique properties such as different wavelengths, and so forth. At 964, the detectors can receive the light and generate a signal indicative of the received light. The controller can receive and analyze the signals from the detectors at 966 and at 968 the controller can adjust the control signal(s) input to the plurality of light sources.

Common Detector Arrangement

A signal from a detector can drift over a given period of time (e.g., its lifetime). For example, the responsivity of a detector can drift. In instances where multiple detectors are used, the drifts of the multiple detectors may not be the same. The signals may include the respective drifts, which may not be detectable, and mathematical functions (e.g., taking the ratio) may not allow for accurate reduction or removal of these drifts from the signal(s).

Figure 10A:
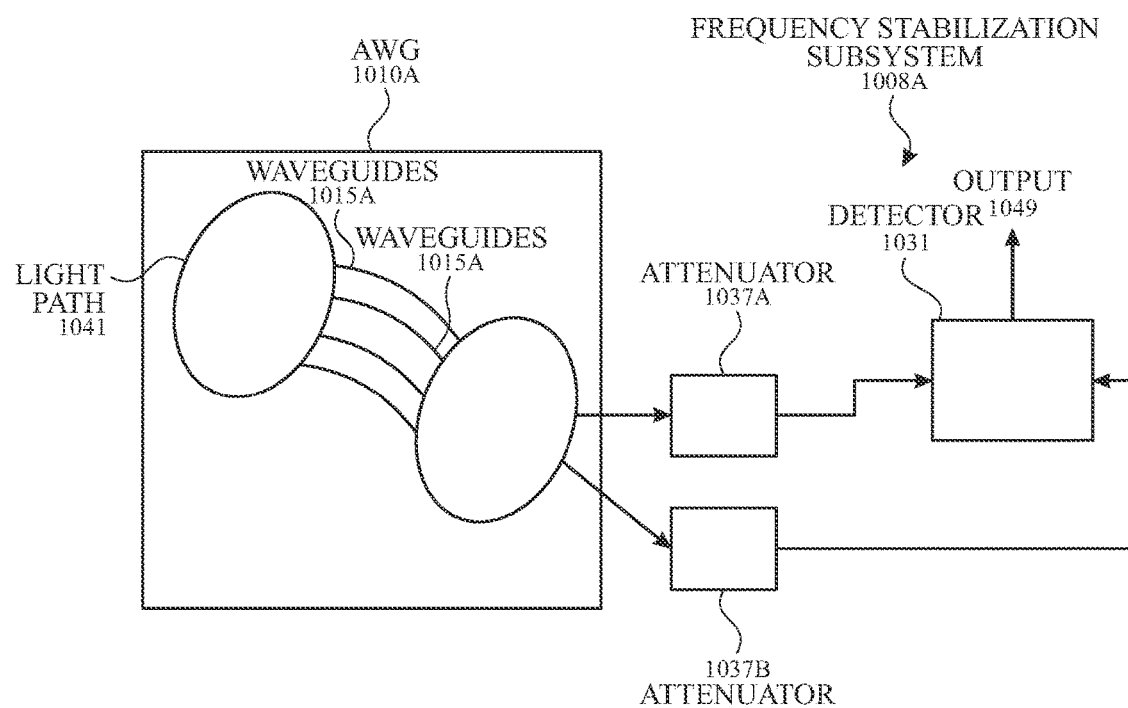
FIG. 10A illustrates a block diagram of an example frequency stabilization subsystem including an arrayed waveguide grating and a common detector.

In some examples, a common detector can be used to remove or reduce the detector drift. FIG. 10A illustrates a block diagram of an example frequency stabilization subsystem including an AWG and a common detector. Frequency stabilization subsystem 1008A can include an AWG 1010A, one or more attenuators 1037, and a detector 1031. The AWG 1010A can have one or more functions and/or characteristics similar to AWG 510A illustrated in FIG. 5A. For example, the AWG 1010A can include a plurality of waveguides 1015A, where at least two waveguides can have different lengths. The AWG 1010A can generate multiple outputs. A first output can be connected to the attenuator 1037A, and a second output can be connected to the attenuator 1037B. The attenuators 1037 can be variable optical attenuators (VOAs), for example. The attenuators 1037 can modulate the signals of the outputs from the AWG 1010A at different frequencies.

The output from one attenuator, such as the attenuator 1037A, can be connected to one side of the waveguide of the detector 1031, and the output from another attenuator, such as the attenuator 1037B, can be connected to the other side of the waveguide of the detector 1031. The detector 1031 can receive the attenuated signals and can generate a signal on the output 1049. In this manner, the same detector 1031 can be used for multiple outputs from the AWG 1010A, and the amount of drift from the detector 1031 included in the output 1049 can be reduced or removed. In some examples, the frequencies that the attenuators 1037 modulate the signals by can differ by 180°.

Although FIG. 10A illustrates one output 1049 from the frequency stabilization subsystem 1008A, some examples may include using a selector that outputs light on a selected light path, such as AWG 510B illustrated in FIG. 5B.

In examples where the multiplexer is a component separate from the selector, one light path can be a focal point of an adjacent grating order of the AWG 1010A, and another light path can be multiplexed into the main grating order. For example, referring to FIG. 5B, the light paths to the detectors 531A and B can be the focal point of the adjacent grating order, and the light path 542 can be multiplexed into the main grating order. The properties (e.g., pitch and width) of the AWG 1010A can be optimized such that some of the light along the light paths to the detectors 531A and B can be scattered into the next grating order (e.g., the grating order adjacent to the main grating order).

Figure 10B:
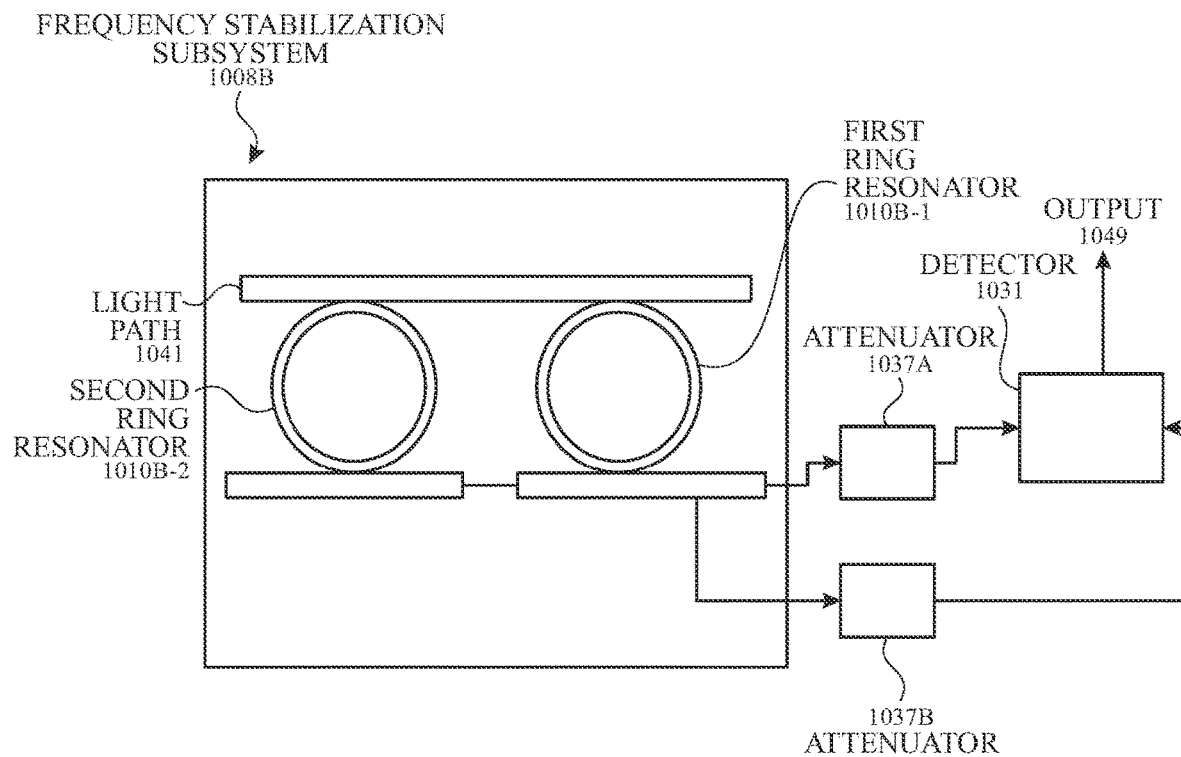
FIG. 10B illustrates a block diagram of an example frequency stabilization subsystem including a ring resonator and a common detector.

In some examples, the frequency stabilization subsystem may include other types of selectors and a common detector. For example, as shown in FIG. 10B, frequency stabilization subsystem 1008B can include a first ring resonator 1010B-1 and a second ring resonator 1010B-2 having one or more functionalities and/or characteristics similar to the first ring resonator 610A and the second ring resonator 610B illustrated in FIG. 6. The ring resonators 1010B can generate multiple outputs. A first output can be coupled (directly or indirectly) to the attenuator 1037A, and a second output can be coupled to attenuator 1037B. The attenuators 1037 can modulate the signals of the outputs from the ring resonators 1010B at different frequencies. The output from one attenuator, such as attenuator 1037A, can be coupled to one side of the waveguide of the detector 1031, and the output from another attenuator, such as attenuator 1037B, can be coupled to the other side of the waveguide of the detector 1031. The detector 1031 can receive the attenuated signals and can generate a signal on the output 1049.

Figure 10C:
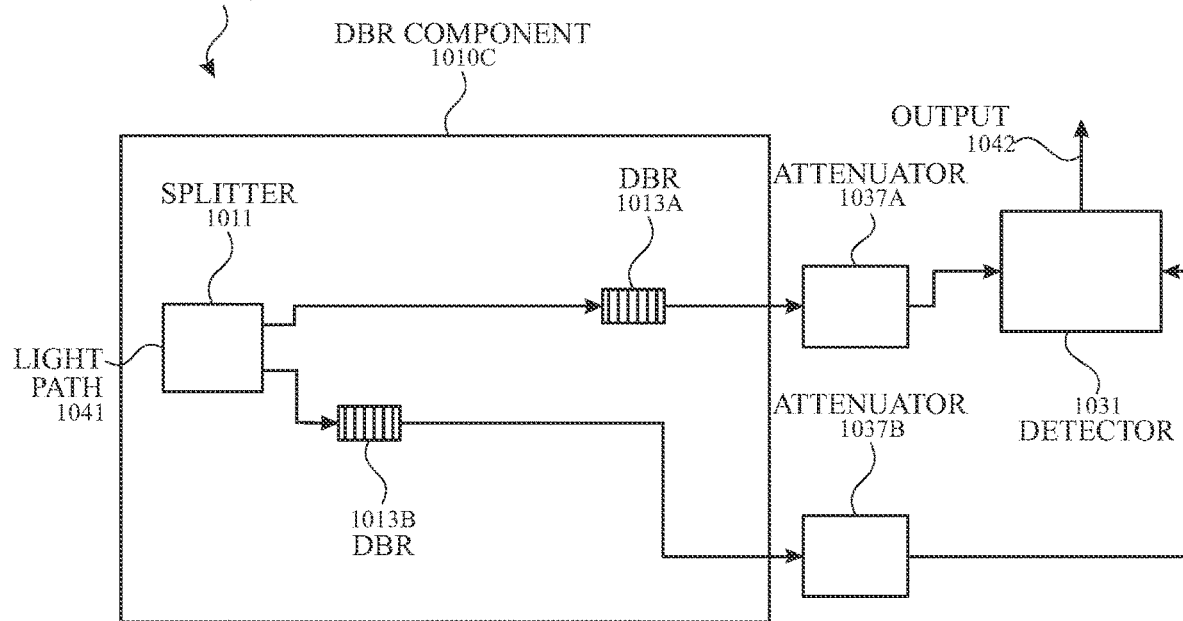
FIG. 10C illustrates a block diagram of an example frequency stabilization subsystem including a distributed Bragg reflector component and a common detector.

As another example, as shown in FIG. 10C, frequency stabilization subsystem 1008C can include a DBR component 1010C having one or more functionalities and/or characteristics similar to the DBR component 710A illustrated in FIG. 7A or the DBR component 710B illustrated in FIG. 7B. The DBR component 1010C can include a splitter 1011 and multiple DBRs 1013A and 1013B. Similar to frequency stabilization subsystem 1008A of FIG. 10A and frequency stabilization subsystem 1008B of FIG. 10B, frequency stabilization subsystem 1008C can be connected to one or more attenuators 1037 and a detector 1031.

As discussed herein, the illustrated block diagrams do not limit the configuration (e.g., location, size, orientation, etc.) of the optical routing lines and components. Examples of the embodiments described herein can include other types of configuration not illustrated explicitly in the figures. Additionally or alternatively, the detector can be any type of detector, such as one that is discrete from the other components included in the frequency stabilization subsystem, or the detector may be an integrated component that is inseparable from the other components.

Detector Including Twin Waveguides

Figure 11:
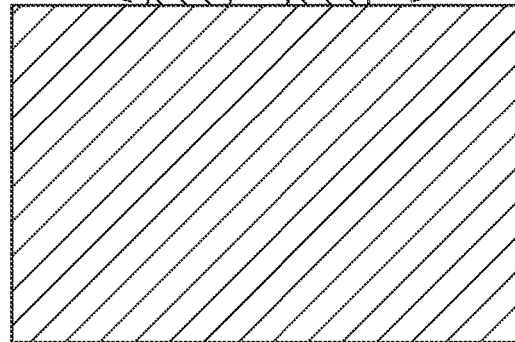
FIG. 11 illustrates a cross-sectional view of an example detector including multiple waveguides formed on the same substrate.

In some examples, the drift in the detectors can be due to one or more material properties such as crystal defects. In some examples, the structure of the detectors may be changed to account for such defects. FIG. 11 illustrates a cross-sectional view of an example detector including multiple waveguides formed on the same substrate. The detector 1130 can include a substrate 1119, where multiple waveguides, such as waveguide 1115A and waveguide 1115B, can be formed on the same substrate 1119. In some examples, the waveguide 1115A and the waveguide 1115B can be twin waveguides, which can be waveguides, spaced with a small separation distance. The separation distance can be such that the wave of distortion from the crystal defects can affect both waveguides. For example, the separation distance 1198 may be in the approximate range of 2-5 µm and can be less than the waveguide's longitudinal dimension (e.g., 10 µm). The separation distance 1198 can be the distance between inner walls of the waveguides 1115A and 1115B.

Multiple Light Sources

Figure 12:
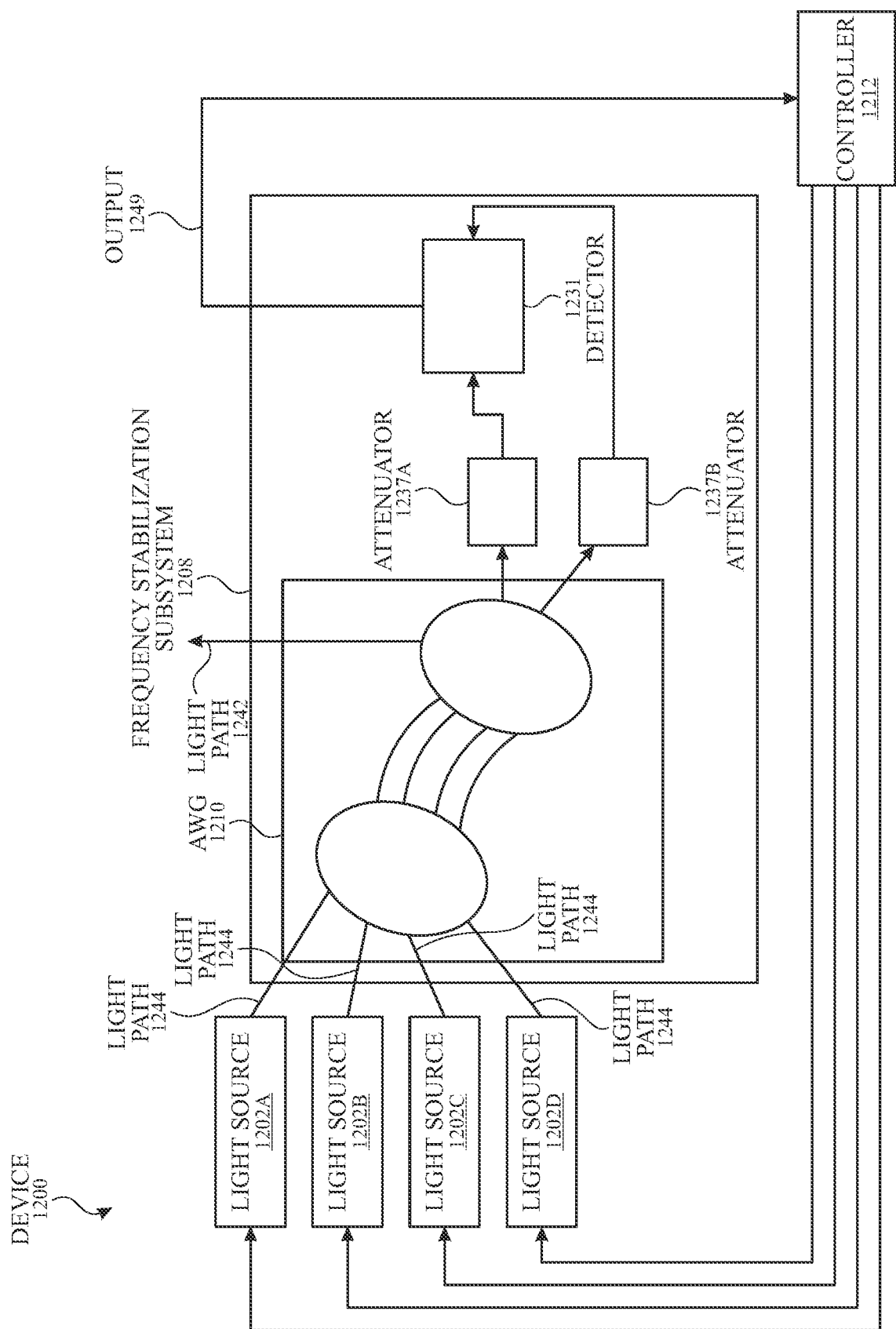
FIG. 12 illustrates a block diagram of an example optical sensing system including a frequency stabilization subsystem including an arrayed waveguide grating and a detector.

Examples of the disclosure can further include the optical sensing system configured with a plurality of light sources. FIG. 12 illustrates a block diagram of an example optical sensing system including a frequency stabilization subsystem including an AWG and a detector.

The optical sensing system can include a device 1200. The device 1200 can include a plurality of light sources 1202, a frequency stabilization subsystem 1208, and a controller 1212. The plurality of light sources 1202 can be configured to emit light along light paths 1244. In some examples, the plurality of light sources 1202 can be configured to emit light having different ranges of wavelengths. Examples of the disclosure can include the plurality of light sources 1202 formed on multiple epitaxial chips.

The frequency stabilization subsystem 1208 can include a selector, such as AWG 1210, attenuators 1237, and one or more detectors, such as detector 1231. Although the figure illustrates an AWG 1210, examples of the disclosure can include other selectors such as filters, resonators, multiplexers, MZIs, Fabry-Perot cavities, nanobeam cavities, ring resonators, DBRs, or the like. The selector (e.g., AWG 1210), attenuators 1237, and detector(s) 1231 can include one or more functionalities and/or characteristics similar to those disclosed herein. For example, the selector can have multiple functions: (1) multiplex, combine, filter, and/or select from its input(s) (e.g., light along the light paths 1244), and (2) generate feedback information for controlling the light sources 1202 via, e.g., the controller 1212. In some examples, FIG. 12 may not include the AWG 1210 and also may not include the attenuators 1237. Continuing this example, FIG. 12 may include an MZI outputting light to two individual detectors 1231.

The frequency stabilization subsystem 1208 can output signals directly from the detector 1231 as output 1249 to the controller 1212. In some examples, one or more components, such as filters, amplifiers, analog-to-digital converters (ADCs), etc. (not shown in FIG. 12) can receive signal(s) from the detector(s) 1231 and can output signal(s) to the controller 1212.

The signal(s) from the frequency stabilization subsystem 1208 can be used as feedback in, e.g., a control loop. A controller 1212 can receive and analyze the signal(s) from the frequency stabilization subsystem 1208 and can generate one or more signals. The signal(s) from the frequency stabilization subsystem 1208 can be the same signals used to control the light sources 1202 and the properties of light emitted by the light sources 1202. In some examples, the signal(s) from the frequency stabilization subsystem 1208 (e.g., output 1249) can be indicative of targeted changes in one or more properties (e.g., temperature, current, etc.) of the light sources 1202. In some examples, the controller 1212 can include one or more other pieces of information (e.g., measured temperature of the light sources 1202) in generating the signal(s).

The frequency stabilization subsystem 1208 can also output light directed to the system interface for a measurement. In some examples, the selector can output the light to the system interface along the light path 1242.

Calibration and Thermal Stabilization

The frequency stabilization subsystem can include one or more components for calibrating its temperature and can include one or more sensor components for detecting a change in its operation. The frequency stabilization subsystem can also include one or more heaters for controlling its temperature, which can affect its operation.

Figure 13A:
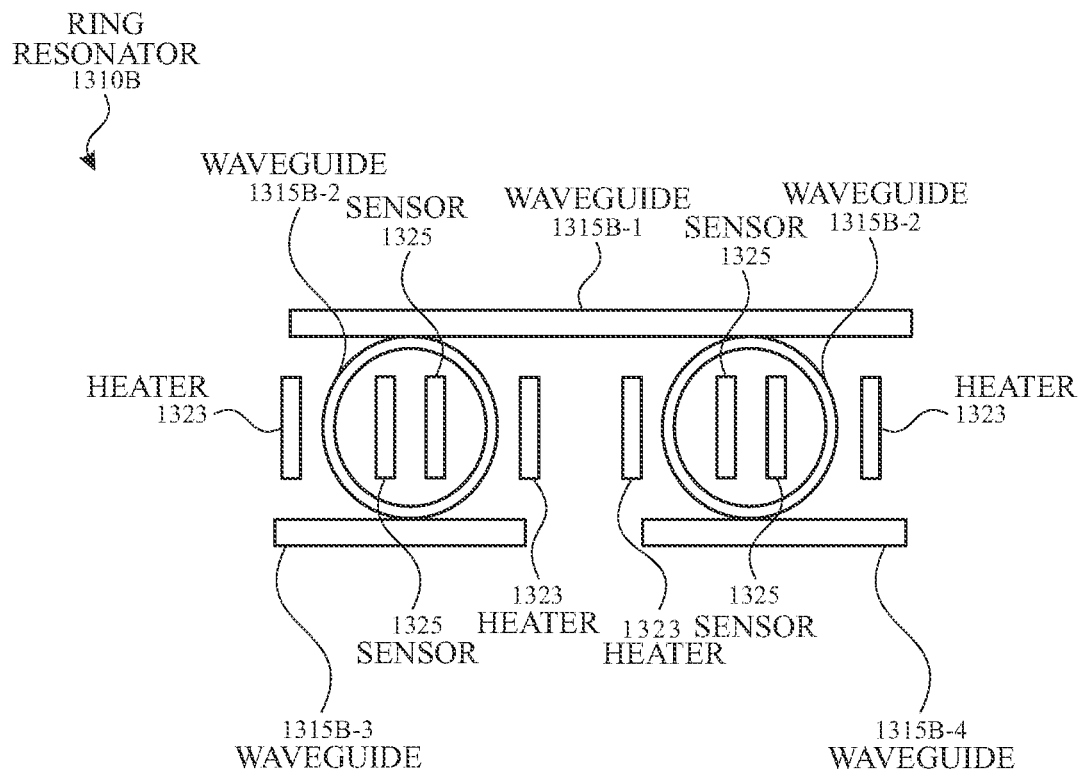
FIG. 13A illustrates a block diagram of an example ring resonator and calibration components.

FIG. 13A illustrates a block diagram of an example ring resonator and calibration components. The ring resonator 1310B can include a plurality of waveguides 1315B. At least one waveguide, such as waveguides 1315B-2, can be looped optical waveguides. One or more waveguides, such as waveguide 1315B-1, can be an input waveguide, and one or more waveguides, such as waveguide 1315B-3 and waveguide 1315B-4, can be output waveguides. Input waveguides can be waveguides connected to light input to the ring resonator 1310B, and output waveguides can be waveguides connected to light output from the ring resonator 1310B. In some instances, the input and output waveguides may include the same structure. A looped waveguide 1315B-2 can include a closed loop that is optically coupled to the input waveguide 1315B-1 and one of the output waveguides 1315B-3 or 1315B-4.

The ring resonator 1310B can include calibration components such as heaters 1323 and sensors 1325. The sensors 1325 can be temperature sensors, for example, that measure the temperature of the ring resonator 1310B. If the temperature of the ring resonator 1310B deviates within a certain threshold(s) from the targeted temperature (e.g., does not meet a temperature criteria), a controller (not shown) can send one or more control signals to the heaters 1323 to change the temperature of the ring resonator 1310B to within the targeted threshold(s).

Figure 13B:
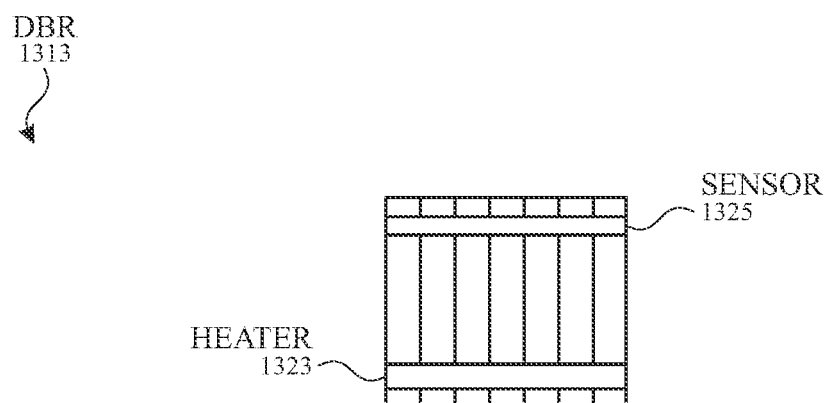
FIG. 13B illustrates a block diagram of an example distributed Bragg reflector and calibration components.

The calibration components can be included in other types of components, such as a DBR, as shown in FIG. 13B. DBR 1313 can include calibration components such as heater 1323 and sensor 1325. Similar to the calibration components discussed above, the sensor 1325 can measure the temperature of the DBR 1313, and this temperature measurement can be used as feedback to the heater 1323 for controlling (e.g., adjustment) the temperature of the DBR 1313. Although a single heater 1323 and a single sensor 1325 are illustrated in FIG. 13B, examples can include any number of heaters, any number of sensors, and any ratio of heaters to sensors. In some examples, the number of heaters and the number of sensors can depend on the size of the component. For example, larger passive components can have a greater number of calibration components than smaller passive components.

Examples of the disclosure can include executing the calibration procedure at periodic intervals, upon system startup, in synchronization with the measurements, when the light emitted by the light sources deviates from its targeted properties, and so forth. Although FIGS. 13A-13B illustrate the calibration components as included in a ring resonator and DBR, respectively, examples of the disclosure can include calibration components as included in other types of passive components, such as those described herein. Additionally, examples can include the heaters and sensors having configurations (e.g., location, size, orientation, etc.) not explicitly shown in the figures. For example, heater 1323 in FIG. 13A may be square or any other appropriate shape, instead of rectangular.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

The foregoing description, for purposes of explanation, uses specific nomenclature to provide a thorough understanding of the described embodiments. However, it will be apparent to one skilled in the art, after reading this description, that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art, after reading this description, that many modifications and variations are possible in view of the above teachings.

The present disclosure recognizes that personal information data, including the biometric data acquired using the presently described technology, can be used to the benefit of users. For example, the use of biometric authentication data can be used for convenient access to device features without the use of passwords. In other examples, user biometric data is collected for providing users with feedback about their health or fitness levels. Further, other uses for personal information data, including biometric data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure, including the use of data encryption and security methods that meets or exceeds industry or government standards. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data, including biometric data. That is, the present disclosure contemplates that hardware and/or software elements can be provided to prevent or block access to such personal information data. For example, in the case of biometric authentication methods, the present technology can be configured to allow users to optionally bypass biometric authentication steps by providing secure information such as passwords, personal identification numbers (PINS), touch gestures, or other authentication methods, alone or in combination, known to those of skill in the art. In another example, users can select to remove, disable, or restrict access to certain health-related applications collecting users' personal health or fitness data.

What is claimed is:

1. A system, comprising:
a light source that emits light along an input light path;
a selector configured to:

receive light along the input light path;
output light of a first wavelength along a first output; and
output light of a second wavelength along a second output;
a first attenuator connected to the first output;
a second attenuator connected to the second output; and
a detector connected to the first attenuator and the second attenuator to receive light from the first output and the second output, respectively, wherein:
the detector generates a signal indicative of measured light from both the first output and the second output.

2. The system of claim 1, wherein:
the first attenuator modulates the light of the first wavelength at a first frequency; and
the second attenuator modulates the light of the second wavelength at a second frequency different than the first frequency.

3. The system of claim 2, further comprising:
a controller, wherein:
the controller receives the signal from the detector;
determines a monitored wavelength from the signal;
determines a difference between the monitored wavelength and a targeted wavelength; and
controls the light source based on the determined difference.

4. The system of claim 1, wherein the selector comprises an arrayed waveguide grating.

5. The system of claim 1, wherein the selector comprises a set of ring resonators.

6. The system of claim 1, wherein the selector comprises a splitter connected to a plurality of distributed Bragg reflectors.

7. The system of claim 1, wherein the first attenuator and the second attenuator each comprise a variable optical attenuator.

8. The system of claim 1, comprising:
a plurality of light sources that includes the light source that emit light along a plurality of input light paths; and
a frequency stabilization subsystem configured to:
multiplex light received from the plurality of input light paths along a common light path;
direct light of a first wavelength received from the plurality of input light paths along the first output to the detector;
direct light of a second wavelength received from the plurality of input light paths along the second output to the detector; and
output the signal from the detector.

9. The system of claim 8, further comprising:
a controller, wherein:
the controller receives the signal from the detector;
determines a monitored wavelength from the signal;
determines a difference between the monitored wavelength and a targeted wavelength; and
controls a light source of the plurality of light sources based on the determined difference.

10. The system of claim 9, wherein the frequency stabilization subsystem comprises:
the first attenuator, wherein the first attenuator is configured to modulate the light of the first wavelength received from the plurality of input light paths; and
the second attenuator, wherein the second attenuator is configured to modulate the light of the second wavelength received from the plurality of input light paths.

11. The system of claim 10, wherein the first attenuator and the second attenuator modulate at different frequencies.

12. The system of claim 10, wherein the first attenuator and the second attenuator each comprise a variable optical attenuator.

13. The system of claim 8, wherein the frequency stabilization subsystem comprises an arrayed waveguide grating.

14. The system of claim 8, wherein the frequency stabilization subsystem comprises a multiplexer.

15. The system of claim 14, wherein the multiplexer light directs light emitted from the light source to the selector along the input light path.

16. A method, comprising:
emitting light from a light source along an input light path;
receiving, by a selector, light along the input light path;
outputting, from the selector, light of a first wavelength along a first output;
outputting, from the selector, light of a second wavelength along a second output;
receiving, at a detector, the light of the first wavelength and the light of the second wavelength;
outputting a signal from the detector; and
controlling the light source based on the signal output by the detector.

17. The method of claim 16, wherein controlling the light source based on the signal output by the detector comprises:
determining a monitored wavelength from the signal output by the detector;
determining a difference between the monitored wavelength and a targeted wavelength; and
controlling the light source based on the determined difference.

18. The method of claim 16, further comprising:
modulating the light of the first wavelength at a first frequency; and
modulating the light of the second wavelength at a second frequency different than the first frequency.

19. The method of claim 16, wherein the selector comprises an arrayed waveguide grating.

20. The method of claim 18, wherein the selector comprises a set of ring resonators.

* * * * *